(12) United States Patent
Ow

(10) Patent No.: US 10,970,412 B2
(45) Date of Patent: Apr. 6, 2021

(54) FILE SHARING SYSTEM AND METHOD

(71) Applicant: Benedict Ow, Las Vegas, NV (US)

(72) Inventor: Benedict Ow, Las Vegas, NV (US)

(73) Assignee: Duvon Corporation, Las Vegas, NV (US)

( * ) Notice: Subject to any disclaimer, the term of this patent is extended or adjusted under 35 U.S.C. 154(b) by 0 days.

(21) Appl. No.: 16/132,396

(22) Filed: Sep. 15, 2018

(65) Prior Publication Data

US 2019/0034656 A1 Jan. 31, 2019

Related U.S. Application Data

(63) Continuation of application No. 14/841,394, filed on Aug. 31, 2015, now Pat. No. 10,078,757, which is a continuation-in-part of application No. 14/097,102, filed on Dec. 4, 2013, now Pat. No. 10,275,609.

(60) Provisional application No. 61/734,951, filed on Dec. 7, 2012.

(51) Int. Cl.
| | |
|---|---|
| *G06F 21/62* | (2013.01) |
| *H04L 29/06* | (2006.01) |
| *G06F 16/182* | (2019.01) |

(52) U.S. Cl.
CPC ........ *G06F 21/6218* (2013.01); *G06F 16/183* (2019.01); *G06F 21/6245* (2013.01); *H04L 63/0815* (2013.01); *H04L 63/10* (2013.01); *H04L 65/403* (2013.01)

(58) Field of Classification Search
CPC .............. G06F 21/6218; G06F 16/183; G06F 21/6245; G06F 21/62; G06F 17/30; H04L 65/403; H04L 63/10; H04L 63/0815; H04L 29/06

USPC .......................................................... 726/8
See application file for complete search history.

(56) References Cited

U.S. PATENT DOCUMENTS

| | | | |
|---|---|---|---|
| 2002/0083124 A1* | 6/2002 | Knox ...................... G06F 16/10 709/203 |
| 2002/0120783 A1* | 8/2002 | Evgey ................... H04H 20/86 709/247 |
| 2004/0002920 A1* | 1/2004 | Prohel ................. H04L 63/0428 705/51 |
| 2005/0234864 A1 | 10/2005 | Shapiro |
| 2008/0147821 A1* | 6/2008 | Dietrich ............. G06F 16/1834 709/216 |
| 2008/0320397 A1 | 12/2008 | Do |
| 2012/0173655 A1* | 7/2012 | McEntee ............ G06F 16/1834 709/216 |
| 2012/0210134 A1* | 8/2012 | Mitter .................. H04L 9/0825 713/171 |

(Continued)

*Primary Examiner* — Kevin Bechtel
*Assistant Examiner* — Quazi Farooqui
(74) *Attorney, Agent, or Firm* — Lightbulb IP, LLC

(57) ABSTRACT

A file sharing system and method for sharing media files facilitates sharing of media without permitting the media to be downloaded, or stored on a server. The file sharing system may further enable lists of files to be shared and responses to be delivered to the media owner during playback by a user. A communication function exists within the system to enable users to communicate with other users within the system. Sharing of digital content may be accepted or rejected by users of the system, and a local personal storage device may be utilized to enable the storing and sharing of media that is hosted off the cloud.

20 Claims, 23 Drawing Sheets

(56) References Cited

U.S. PATENT DOCUMENTS

| | | | |
|---|---|---|---|
| 2013/0282762 A1* | 10/2013 | Baentsch | G06F 21/6218 707/783 |
| 2014/0074790 A1* | 3/2014 | Berman | G06F 11/1448 707/649 |
| 2014/0089419 A1 | 3/2014 | Morris | |
| 2014/0089421 A1 | 3/2014 | Morris | |

* cited by examiner

FILE SHARING SYSTEM AND METHOD

CROSS-REFERENCE TO RELATED APPLICATION

This application is a continuation of U.S. patent application Ser. No. 14/841,394, filed Aug. 31, 2015, which is a continuation-in-part of U.S. patent application Ser. No. 14/097,102, filed Dec. 4, 2013, which claims priority to U.S. Provisional Patent Application No. 61/734,951, filed Dec. 7, 2012.

BACKGROUND OF THE INVENTION

1. Field of the Invention

The present application generally relates to data storage and access and in particular to systems and methods for allowing access to files between users for the purpose of storing and sharing digital media in a network environment.

2. Related Art

The devices, features and functions described herein are intended to address shortcomings in traditional file storage and sharing systems, often referred to as cloud storage. There are currently a number of file sharing methods available that offer users the capability to share media (files, folders, music, movies, etc.) between devices and between users.

File access control systems and methods are known in the prior art to enable what is commonly referred to as "file sharing." Such prior art file sharing systems and methods employ a variety of ways to allow local and remote access to stored electronic media, such as files, folders, data, movies and music, for example. The file sharing system and method herein provides new functionality to improve capabilities for sharing media, while addressing other shortcomings with traditional media storage and sharing systems.

From the discussion that follows, it will become apparent that the present invention addresses the deficiencies associated with the prior art while providing numerous additional advantages and benefits not contemplated or possible with prior art constructions.

SUMMARY OF THE INVENTION

As will be detailed further below, the file sharing system and method herein addresses additional specific needs, including but not limited to, combining management of permissions for shared media, controlling shared media after the share has been implemented, storing and sharing from locally (user controlled) cloud devices in a non-cloud geographic location, sharing a single item of media (file, folder, song, video, etc.) between multiple users with varying permissions, the creation and sharing of multiple files simultaneously within a list, a method for assigning controls and permissions to the file list being shared. The file sharing system and method has various embodiments, including but not limited to, a file sharing method where multiple copies are not required to facilitate a sharing environment, a system where the shared media can reside in a single remote location, and a system where multiple users can stream the media from a device placed in a user selected location, and other embodiments, platforms and architectures into a single system.

When using prior art file sharing systems and methods to access remote electronic media, a user typically downloads a copy of the digital media file(s). Once the desired digital media files are downloaded, the digital media files become visible to the user, and the user is then allowed to access them.

A first shortcoming of prior art file sharing systems and methods is that they result in multiple copies of the electronic media residing on various devices. A second shortcoming of prior art file sharing systems and methods that it is difficult to control and track changes and/or updates to the original electronic media. A third shortcoming of prior art file sharing systems and methods is the inability to visualize the electronic media files regardless of whether the electronic media files are stored locally or remotely. A fourth shortcoming of the prior art is the media now becomes property of a second or third party, and the ownership rights of the media have been taken away from the original media owner.

The file sharing systems and methods disclosed herein enables a user to select and share any number of files, folders, songs, videos, pictures and other digital media with an unlimited number of recipients, while maintaining control of the media being shared, and limiting the number of copies being downloaded or otherwise distributed. The file sharing system provides enhanced control elements to enable the media owner to manage, control and otherwise administrate their personal media shares. As will be described herein, the file sharing system includes functionality that limits the user receiving the media to make copies, forward or distribute the media, or otherwise download it. Additional functions will be described wherein a local device can be placed at the customer's premises, for storage and distribution of their media and digital content. While the file sharing system does not require the use of the local device, the local device offers the user an alternative location to store their media. Specifically, they can store all of their files on their local device in their own home or office instead of in the cloud. This gives the user more security and control of their files and media. The file sharing system is typically controlled by a cloud-based operating system that enables users to manage and distribute files of their choosing, while maintaining control and ownership of the files.

In one or more embodiments, the file sharing system relies on an operating system, that may be hosted on one or more remote servers, such as in a cloud service, to enable users to control and share their media with one another. The operating system is configured to control the sharing architecture, including what permissions granted to the media, the length of time the permission is in place, the ability for the recipient to manage and control the media being shared, and other key aspects of control. By hosting the operating system on a remote server, the file sharing system and method negates the need for users to install software on their personal client devices (such as personal computers, tablets, smartphones, and the like) to access with the file sharing system.

The operating system is configured to work with a client device to enable file management and control, and can be used with various client devices to manage and control the sharing and delivery of media.

The file sharing system also provides features for media providers or producers of digital media. For instance, the file sharing system allows a local device to be placed at a location of a media provider's choosing, which will enable such provider to host and share their media on the device, while controlling the sharing architecture, permissions and management aspects remotely. Similar to other users, a media provider can easily utilize various devices now known or later developed (such as laptops, personal computers, tablets, smartphones and the like) to initiate, control and otherwise manage their media sharing via the file sharing system.

The file sharing system provides a method for storing historical data about digital content that is managed through the system that goes well beyond typical "file back-up" technologies. In traditional "storage and backup" systems, file information such as file size, content, data type, date and time stamp and other information is stored. The file sharing system identifies and archives information about the file(s) that is not otherwise a component of the file itself. The additional data stored is a virtual "image" of the environment in which the file resides, and within the assigned management criteria of the file. This information may include (but is not limited to) data pertaining to file sharing, the access and rights permissions assigned by the file owner, the location of the file when the share occurred, and the directory structure in which the file resides in the host system, and other data encompassing the environmental aspects of the file.

The file sharing system provides a method for sharing digital content between one or more parties, where the digital content is not hosted on, and is not stored on a web or internet type server. The sharing is direct between the host and the one or more recipients of the shared digital content, and is governed by controls to assign rights to each recipient, based on the needs of the host. In one example, a file (digital content) may be shared from a host's tablet to multiple recipients, each given different access rights. One recipient may be granted download permission, where they are granted permission to receive a digital copy of the content, and a second recipient may be granted "view-only" permission, wherein they may view or stream the digital content from a host location, but may not otherwise take ownership of the content.

The file sharing system provides a "time to live" expiration function that governs the life of shared digital content, as well as the access rights and usage rights of the digital content being shared. In one embodiment, digital content may be shared or passed from a host location to one or more recipients, wherein the recipient device (pc, smartphone, tablet, etc.) may not be online. The host may choose to have the digital content temporarily stored on a $3^{rd}$ location until such a time as the recipient device becomes available to receive the shared digital content, or until the parameters on the share expiration have been met.

A communications system is provided within the file sharing system that allows both the system and the users of the system to instantly and directly share messages between one or more parties. In one embodiment, the file sharing system may send a message to the one or more parties, notifying them that shared content is due to expire. In another embodiment, one or more users may communicate directly via type-written messaging. Multiple users may communicate simultaneously, or individually as needed. The communication link established between the one or more users is a peer-to-peer channel, and therefore does not require a web server to facilitate the communication.

The file sharing system provides the capability for a user to prevent or block receiving a share from one or more parties. Specifically, a user can choose to disallow one or more users from sending them content through the system. The ability to block unwanted or unsolicited communications and file sharing provides an added level of privacy for users within the file sharing system. It's important to note that this capability, along with all other functions referenced in this submission may be enabled and/or disabled by the file host as necessary to ensure complete file control and security.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION OF THE PREFERRED EMBODIMENTS

Figure 1A:
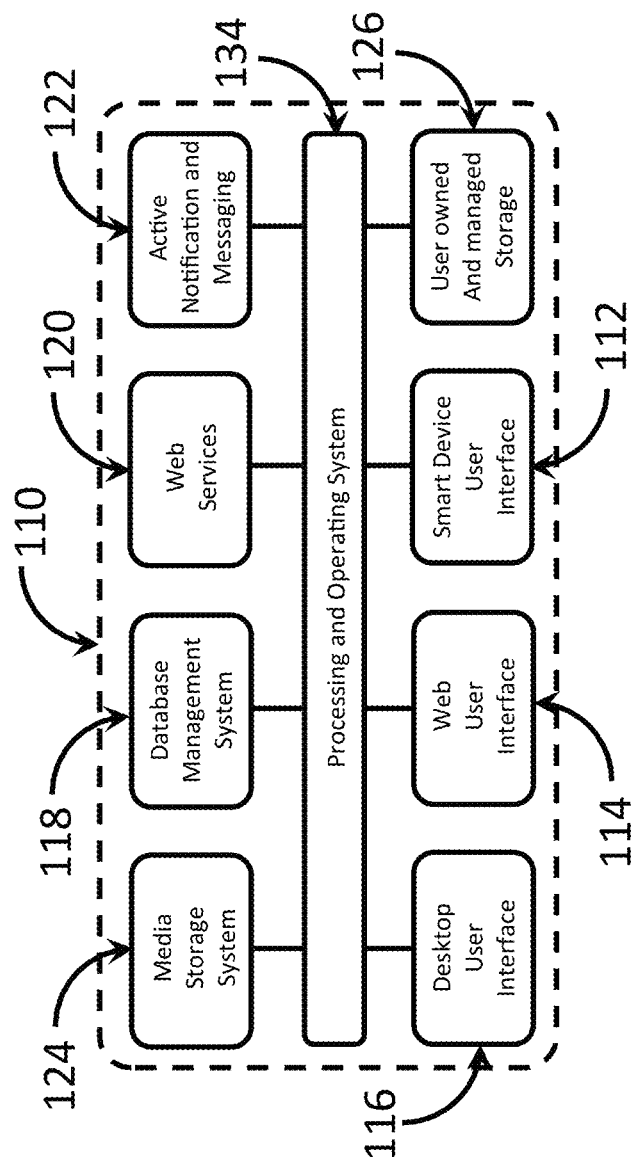
FIG. 1A is a block diagram illustrating an example environment and components making up the systems, devices and methods for the present application.

In the following description, numerous specific details are set forth in order to provide a more thorough description of the present device. It will be apparent, however, to one skilled in the art, that the present functional aspects of the device may be practiced without these specific details. In other instances, well-known features have not been described in detail so as not to obscure the specific detailed claims of the device.

Unlike file sharing in its traditional sense, the present application describes file sharing systems, devices and methods that include a unique sharing mechanism that does away with the traditional requirement for multiple copies of digital media files to be downloaded to various devices to allow access or media visibility on each device. The systems, devices and methods of the present application allow the sharing of digital media files to take place across multiple devices and platforms, while enabling the digital media files' owner to determine which users may access the primary (original) copy of the digital media files.

Generally, file sharing is defined as the act of sharing and/or otherwise allowing access to digital media files across or between networks and/or users. According to the present application, a user of media shared by one source can be the owner of media shared to other sources. The systems and methods described herein do not impose any practical limitations on the number of users that can share an individual piece or multiple pieces of information. Sharing and accessing of media can include, but is not limited to, viewing, playing, streaming, storing, downloading, copying, saving, distributing and creating multiple instances of the media across devices.

The present application describes systems, devices and methods for allowing access to files among users. The systems, devices and methods described herein do not require the downloading of files as a prerequisite to access. The systems, devices and methods described herein enable visualization of the files regardless of whether the files are local or remote. The systems, devices and methods described herein further enable changes to the files to be controlled and/or tracked.

1. File Sharing.

To aid in understanding the embodiments disclosed herein, the term "file" will include (but not be limited to) any digital media that can be stored on, transferred to, copied in, or otherwise managed in a digital medium, such as a computer or other computing device, such as but not limited to laptops, smartphones, tablets, game consoles, media players, and the like. The term file also refers to files, folders, videos, images, pictures, songs, recordings, notes, documents, drawings, spreadsheets or other digitally stored media.

For the purposes of this disclosure, a user is defined as a person who is actively utilizing the system for the purpose of managing and sharing their files. A recipient will be a person that receives a share initiated by a user. It is important to note that the file sharing system herein does not require the recipients to join a service, download special software, utilize usernames and passwords or incorporate other methods for receiving shared material. Further, the file sharing system does not require recipients to store the shared media on their personal devices unless they choose too and are (or have been) granted that permission by the user. In addition no special media viewers or players are required by recipients to play songs and audio files, or to view movie and video files. The file sharing system is configured to conduct any appropriate media conversions and formatting to allow music and video files to be played via a standard media viewer/player or via a media viewer/player that may be provided with the file sharing system.

As stated, unlike traditional systems that share files, the file sharing system provides a method of allowing a user to share a file without the need for any recipient to download the file to have access to it. The principal behind the method is that by definition, a "share" is when one user allows another to use a file. Likewise, the file sharing system allows this share specifically to enable the owner of the media to maintain control and ownership of the file. This prevents unauthorized creation of multiple copies of files as is the case with emailing an attachment. While the media owner can grant permission for one or more users to download or otherwise receive the media, download capability is not required for sharing.

As will be described below, the file sharing system provides the capability of sharing one or more files simultaneously with one or more users, while allowing the user to control the access of each individual and each file being shared. The following information will detail the preferred embodiments of the file sharing system. Sharing can be performed in various ways that will be described in detail throughout this submission. Sharing types include link sharing; email sharing; permission based sharing; social media sharing and other methods.

2. Permission Based File Sharing.

The file sharing system and method provides a unique security implementation that allows a user to assign attributes to one or more files to control how such files are used by a recipient of a shared file. This permission based sharing method does not require passwords or other types of file protection that are inconvenient and are otherwise easier to defeat. By assigning usage permissions to a file prior to sharing it, the owner of the file can maintain control of the file, even after the share has been initiated. Further, the user can modify or change those usage permissions any time after the share has been initiated. There is no time limit or constraints on the control of usage permissions.

The user may grant usage permissions based on the individual recipient of a file, instead of based one the actual file itself. The permission level of sharing may be determined at the time an invitation to share a file is created, ensuring that the user controls the process. It can be seen that usage permissions assigned using this methodology can easily be changed and/or revoked at a later time, at the discretion of the user.

3. File List Sharing.

The file sharing system also provides the capability to create a list of files for the purpose of sharing large numbers of individual files without requiring the user to move the files into a specific location within a file system. This list sharing feature enables the user to quickly and easily create a file list, and simply tag files to add them to the list. Further, the list can be modified at any time of the users choosing. Modifications to the lists will affect all recipients of the list, assuming it has been shared. Lists can be named, renamed, shared, re-shared and managed.

The list sharing feature is particularly well suited for use in instances where the user wishes to share song or video lists. These lists can be played in sequential or other order easily at the touch of a button by their recipient, and do not require any external players to allow the user to play the media files. Further, the lists can be played and streamed directly from a user's PCD (personal cloud device) or from their online storage account with the file sharing system. This negates the need for recipients to download or otherwise take possession of the media files to enjoy them. As with other shares within the file sharing system, usage permissions can be assigned to a list to govern use of the one or more files therein. As will be described further below, the term "PCD" refers to a storage server or other computing device personal to the user through which the user's files may be transmitted to one or more recipients. A PCD will typically implement the file sharing system to provide filing sharing to users and their recipients.

4. File List Usage Permissions

As with individual files being shared by users, a media provider can set usage permissions to a file list for the purpose of maintaining control of the shared files therein. This media provider type user can also assign and change the usage permissions of the listing at any time before, during or after the list has been shared. File attributes typically do not change when being added to a list. This allows a single file to be assigned to multiple lists, without impacting the file itself. The usage permissions relative to a particular file are defined by the list that the file is associated with. This enables a user to create multiple lists containing some of the same files, while independently managing the usage permissions for each share.

5. File Link Sharing

The file sharing system provides a method for sharing a URL or similar type of link to access a file. The link can be associated with one or more files simultaneously (i.e., a list), and can be shared via the permission based sharing method described herein. The purpose of the link sharing method is to allow the user to easily create a link to the one or more files being shared and distribute it via an email, SMS or other text message, browser window or other communication medium.

6. Personal Cloud Device (PCD)

The file sharing system provides an optional external file repository at a Personal Cloud Device or "PCD." The PCD is a mini-server that is configured to reside at a location of a user's choosing, and communicate with the file sharing system to enable sharing and file management for media. The PCD needs only to be connected to a network (e.g., the Internet) in order to be accessed and controlled by the user. All of the sharing, controls, management tools and accessibility will function identically as if the media was being stored on a remote server or cloud service instead of on the PCD.

A recipient will therefore have no knowledge of where a shared filed is being stored or shared from. The recipient will only know they received the share. The PCD is provided as an alternative for users who are not comfortable storing their files on a remote server or cloud service, but want the ease of use, sharing and accessibility associated with the file sharing system. The files can reside on, and be shared directly from the PCD without physically being copied to, or otherwise residing in the cloud. This implementation of the file share also adds an extra layer of security and privacy for the media being shared because it resides solely on the PCD.

7. DLNA and the PCD

The PCD has the capability of accessing and playing media stored on the device to locally available DLNA enabled appliances like TVs, DVD players, cable boxes and other generally known internet-enabled devices. DLNA is an acronym meaning "Digital Life Network Alliance" which is a specification for accessing and streaming media over LAN, WAN and other networks.

8. The PCD and Streaming Media

As set forth above, PCD can be thought of as a server, and as such provides the capability of allowing users to remotely stream media right from the PCD. In the instance of a file sharing arrangement, a recipient can receive a file share (e.g., a song list or a video) and can stream the media directly from a user's PCD. The streaming of media does not require a media player to be downloaded or otherwise implemented by the recipient of the media share. The recipient can simply select the file being shared for playback, and the media player provided within the file sharing system will automatically play the media file. Multiple local and/or remote recipients can access the same media at the same time and stream it with varying start and stop points. Each stream will typically be independent, regardless of the file being streamed. As an example, two or more users can stream the same video file on two different local or remote devices simultaneously, but the instances of the media playback are independent, allowing the users to start, stop, pause, rewind, fast forward and other activation methodologies simultaneously and independent of one another.

In instances where the recipient of the media share has a PCD, that media can be streamed to their locally available (DLNA enabled) TV or other Internet ready media device. This allows recipients to share video content and watch it on their local television sets.

9. Native Media Player

Unlike traditional systems, the file sharing system includes a native media player that allows the user and the respective recipients of shared media files to view the files without the need for a third party player or viewer to be accessed. By incorporating a native player into the PCD for example, the user can share multiple file types without restriction.

In order to facilitate this native player functionality, the PCD performs a media conversion of the files stored on the PCD. This media conversion takes an original media file and converts it to a format that is usable within the native player. The original copy of the file remains intact because the PCD stores a second converted copy of the file. When the file is shared with download permission enabled the recipient will receive a copy of the original file in the original format. The converted file is not transmitted to the recipient in this situation. If a file is streamed from the PCD, the converted file is transmitted to facilitate ease of use since the converted file can be played via the native player (which is executable without installing additional software or hardware).

In general, file conversion applies to all media types. This includes but is not limited to audio, video and document file formats now known or later developed. By providing a native player with the file sharing system, the need for a third party player is negated. This allows the user to share all of their media with friends and family, without the concerns associated with file compatibility issues. This also provides a significant savings of space on the recipient portable devices. When media is added to the PCD, the conversion begins immediately. There is no manual access or involvement with the media conversion process. The process is initiated when new files are stored on the PCD or other storage device of the file sharing system.

Media files that are stored on the PCD can be streamed directly from the unit by one or more local or remote users simultaneously. Unlike other file sharing methods, the PCD allows multiple users to access media simultaneously from various start and stop points. As an example, one or more users can be viewing the same file (e.g., audio, video, picture, document, etc. . . . ) at the same time, without interrupting or otherwise obstructing the viewing access of others. This allows the user to access and share their files without concern for remote access of recipients.

The native media player allows users and share recipients to access and view (or play) the media on their personal computers as well as their portable devices. These devices include, but are not limited to tablets, smartphones, tablets, media players, game consoles and other portable internet ready media devices. The native media player may be implemented in software only or via a combination of software and hardware.

10. DLNA Streaming of Shared Media through the PCD

The file sharing system allows for a user who owns a PCD to locally stream (via DLNA) any shared media to a DLNA enabled device on their local network. In typical DLNA applications, the media being streamed or viewed on a DLNA enabled device (e.g., a TV) needs to be hosted locally, somewhere on the local area network (LAN) via a DLNA enabled hard drive or other repository. The file sharing system and method provides the capability of a local user to navigate to their PCD through their DLNA enabled device (e.g., a TV) and see all of the shared content. This allows the user to enjoy shared media (e.g., songs, pictures, videos and other content) on their DLNA enabled TV, without having to use a PC, laptop, tablet, smart phone or other internet ready device to enjoy the material.

11. PCD to PCD Media Share

The file sharing system provides the capability of users to share their media from one PCD to another PCD for the purpose of streaming the media to a local DLNA enabled device (e.g., a TV). The application for this implementation is when a user shares a piece of media with a recipient. The recipient will authenticate their right to access the media through the file sharing system. Once the authentication takes place, the files shared with a recipient by a user are transmitted directly from the users PCD to the recipient's PCD. This eliminates the need for the files to go through the file sharing system in that the file is transmitted directly between the user and recipient.

12. Instant Reply Feature

The file sharing system provides a methodology for an instant reply for media files through its media player and the media management system. This instant reply allows the media user to create a response to a shared media file from within the player, without the need for the user to initiate an external communications mechanism, or otherwise minimizing or exiting the program to initiate the reply. The disclosed systems, devices and methods incorporate a unique communications methodology which facilitates the reply from within the player to allow a direct communication from the user to the host to transpire.

The instant reply feature allows recipients of videos, pictures, movies and other files to affect a response from within the viewer or player, while the media is being accessed. The response is provided to the user who was responsible for initiating the activity of sharing the media with the recipient.

In operation, once a media file is opened, the recipient may access the instant reply feature, for example by simply clicking on the envelope icon imbedded inside the media player or file viewer. Once the instant reply feature is invoked, an interface such as a pop-up window appears within the player, on top of the media, where the recipient can type in a message to the user. The "to" field will auto populate and be addressed to the user. The "from" field will also auto populate with the contact information of the user. Once the recipient has entered in the content of their message, the recipient simply clicks the send button to complete the message submission. The message will be sent immediately to the user.

The instant reply feature may support the following message formats: email; SMS or other text messaging and instant messaging, but it is envisioned that the instant reply feature may be easily extended to future communication formats. The media player and viewer may allow the recipient to set a default reply to be incorporated by the media player and/or media viewer. The default setting may be used as the primary source of the instant reply until the source is changed by the recipient.

13. Notifications

The file sharing system provides a notifications function that enables multiple types of notifications to be provided to both the user and the recipient of a file share. Notifications are tracked within the system so they can be recalled by the user. This allows the user to review past notifications to determine when shares happened, what the result was of the media share, and whether or not the recipient ever viewed the material that was shared.

Notifications have a number of different modes, enabling the user of the file sharing system to determine how they would like their notifications to appear and function. Any or all notifications can be disabled (or simply ignored) at any time by the user.

Share notifications are provided to allow the recipient of the media to know that a user has shared media with the recipient. Although the notification can be received by the share recipient in various ways (e.g., text messaging), the notification defaults to an email that is sent directly from the system to notify the recipient of the share. While the system is directly generating and sending the notification (without the need for an external email program to be launched), the email address line contains the email address of the file owner in the header. This ensures that the recipient of the share will recognize the friend sending the share, and it will not end up in a spam or blocked email folder. The email share notification allows the user (media owner or host) to create a personal message from within the system prior to initiating the share. This allows the user to provide information about the media contained in the share without launching a third party application (e.g., an external email program) to notify the recipient of the share and the associated contents.

In cases where the user of the file sharing system has shared a list with a recipient or group of recipients, each recipient of the share will be notified automatically when the contents of that list are updated by the user. If the user adds media to the list, each recipient taking part in that share will receive a notification that the list has been updated. The user can choose to add a personal note to the update notification from within the file sharing system, or allow the notification to be sent without comment. The file sharing system user can also choose to disable this notification.

The file sharing system also provides a "read receipt" notification that immediately lets the user know that the recipient has seen and/or received the shared material. This instant notification provides positive feedback to the user that their media has been received by the intended recipient. The user has the ability to enable or disable this feature in the notifications menu.

Each share toggles an automatic response from the file sharing system that sends a notification (e.g., an email, SMS, text or other message) to the recipient, notifying the recipient that a new file, folder of files or list of files has been shared. It's important to note that regardless of the type of share or the media being shared, the notification can be sent from the file sharing system to the recipient. All videos, pictures, songs, files, folders, documents and other digital files that can be shared will trigger a notification.

The file sharing system can provide notifications about virtually all file activity that takes place within the system. These notifications include, but are not limited to file uploading, file downloading, file shares initiated, file shares received, file sync, system level notifications and others. Notifications can be individually controlled by the user of the file sharing system, or they can be managed and controlled as a group. Controls include enable and disable of each notification, as well as the time and/or frequency of notifications. By the very nature of a notification, they can become overwhelming rather quickly if the user shares multiple files and folders with large groups. For this reason, the user can determine the frequency and method of notification receipt. Or they can simply disable the notification. In all instances, the notifications will still appear in the history log.

The file sharing system provides a notification history log to track all information pertaining to the system. As described above, the system notification log will track and record all shares, downloads, uploads, syncing and other activities. Each activity may be individually time and date stamped, and is filed in their appropriate folder location within the system. Notification Folders include "System," "Share," "Upload," "Download," and "All."

The file sharing system provides for backing up of digital content for the purpose of future retrieval, archiving and historical recording. In conventional backup methodologies, only the file and the associated file metadata are backed up to a storage device. In the file sharing system, the environmental information pertaining to the file, such as the physical location (user, drive, directory, folder) is stored, along with the number of times the file has been shared, the associated permissions utilized during those shares, the number of copies of the file that have been stored in alternative locations, and other information pertaining to the history and activity of the file, from the time the file enters the file sharing system, up to the time in which a backup of the file is performed.

The benefit of this embodiment is that a backed up file may not be restored without the owner of the file first authenticating their ownership, while also allowing the attributes assigned through the file sharing system to be recalled instantly when the file is restored from a backup state. This means that when a file is restored from a backup configuration, the file attributes, the file location within the directory, the shares the file has been participating in, the permissions and access rights pertaining to those shares and all other physical and addressing attributes will be restored. The backup is a virtual image of all file attributes from the moment the file entered the file sharing system. While the file itself is backed up to a location of the owners choosing, the historical data collected during the life of the file within the file sharing system is managed and stored through the file sharing system. Hence, the two backup components are separate. Since the file owner physically possesses the digital content, they can restore it at any time without connecting to the file sharing system. However, if the file is restored within the file sharing system, all of the attributes assigned through the system will also be restored.

Sharing of digital content is performed in a fashion wherein the digital content will pass directly from the host without being copied to, or stored on a web based server. More specifically, the host of the digital content will authenticate their ownership with the file sharing system to gain access to the sharing controls. Once activated, the sharing controls will manage the access permissions and attributes of the share, as required by the owner of the digital content being shared. While a typical sharing scenario does not require a recipient to authenticate their rights to the shared content, a preferred embodiment would require them to authenticate their rights to access the shared content. Once each party has completed their authentication process, a direct link between the host and the one or more recipients is established. The digital content can now be accessed by the one or more recipients, directly from the content host. The file sharing system will note the actions taken with the digital content during this transaction and store the information for historical purposes and later retrieval.

It's important to note that the file sharing system does not "change" the data associated with a file, but rather adds to the data to allow the collection and retrieval of historical "life cycle" type of data pertaining to digital content managed within the system. The information collected and stored as a part of the historical archive for the digital content can include the number of times the content has been shared, the number of times the content has been downloaded, the parties (and their identifiers) the content has been shared with, and even the people the second and third parties have shared the digital content with. This "historical image" of the lifecycle of the digital content allows the file sharing system to instantly recover digital content parameters that are not stored in a typical backup operation.

The file sharing system provides a "time to live" function that enables users to add expiration elements to their digital content storage, sharing and streaming activities. In one embodiment of the time to live, a file may be shared from a file host to one or more recipients, wherein a time to live has been placed on the shared content, causing the share to expire at a time selected by the file host. In another preferred embodiment, a file share may be directed to a secondary storage facility (such as a hard drive or a privately owned personal cloud device) in the event a share was executed, but the recipient failed to receive the shared material prior to the time to live expiration. The time to live function may be enabled and or disabled at any time by the file host, giving the host complete control over the expiration functionality of the stored, shared or streamed digital content. In another embodiment, time to live may be applied to a file that has already been shared from the file host to one or more recipients.

The time to live function may be enacted on either the digital content being shared from the host to one or more recipients, or can be enabled specifically on the recipient of the shared digital content. As an example, a file may be shared with a first and a second recipient. The first recipient has been granted download capabilities to the file, while the second recipient has been granted "view only" access rights to the file. The time to live function is enabled on the second recipient, limiting the time that the view only access rights remain active. It's important to note that in the above example, the time to live function may be enabled on either the first recipient or the second recipient, or both.

The time to live function works in conjunction with other elements of the file sharing system (e.g., the security features and file access permissions) to further enhance the digital content host(s) ability to manage their content.

The file sharing system provides a communications capability that allows one or more users to communicate with each other in a public, group-type chat configuration, or a more private one-on-one type of communication. The file sharing system provides controls that allow each user to determine if the contents of the communication between them and other users is to be stored for historical purposes, or to not be stored, in which case the contents of the communication will be removed from the system. In an open-communication type utilization, one user may leave a message for a second user. The second user can access and respond to the message at their leisure. In a live communication setting, each user may select to keep the contents of the communications private. All parties (users) in a given communications session must agree to allow the contents of the communication to be stored, or the communications session will be deleted from the system upon completion of the session. This ensures complete privacy of communications within the file sharing system.

Additional features, advantages and embodiments of the device may be set forth or apparent from consideration of the following detailed description, drawings and claims. Moreover, it is to be understood that both the foregoing summary of the device and the following detailed description are exemplary and intended to provide further explanation without limiting the scope of the device as claimed.

Detailed operation of the features and functions of the file sharing system and method therefor will now be described with reference to the provided drawings and figures.

FIG. 1A is a block diagram representing the elements of the file sharing system 110, and how they are implemented and managed. The file sharing system is controlled by a processing and operating system 134 that manages all aspects of control and reporting within the file sharing system 110. The processing and operating system 134 interacts with the individual modules and elements (112, 114, 116, 118, 120, 122, 124, & 126) that comprise the file sharing system 110.

The details of the modules contained within the file sharing system 110 will now be described with reference to FIG. 1A. The file sharing system is comprised of a number of component control modules designed to administrate and manage functions within the system 110. The modules include a Smart Device User Interface 112 that manages all communications with the system 110 being accessed through generally known devices such as smart phones and tablets. The Web User Interface 114 manages communications with the system 110 that are received through commonly known internet browser software including, but not limited to, FireFox, Internet Explorer, Google Chrome, Apple Safari and other generally known web browsers. The Web User Interface 114 allows any users that have rights to the system 110 to access the system 110 through any personal computer connected to the internet. No special software is required to manage the system 110. All system 110 functions can be managed from any personal computer with internet access and a generally known web browser. This eliminates the need for special control software to be installed on multiple personal computers for system management. The system 110 also provides a desktop user interface 116 that provides customized controls and capabilities such as file sync to allow the user enhanced management capabilities from their personal computer. The system 110 provides a database management system 118 that controls all of the media management within the system 110. The database management system 118 is responsible for file and directory structure within the system 110, as well as file location, placement and access within the system 110. The system 110 provides a web services 120 module that enables the web user interface 114 to function properly within the system. Since no special software is required to manage the system 110, the web services module 120 is responsible for interpreting and delegating commands and management sequences received through the web user interface 114. The system 110 also provides an active notifications and messaging system 122 to keep track of all activities that happen within the system. These activities include, but are not limited to, file uploads, downloads, shares in, shares out, deleted files, list creation, usage permissions and other management and notification aspects within the system. The user can choose to store all of these notifications indefinitely, as well as to clear the notification cache at a time of their choosing. The system 110 also provides a media storage system 124 for use in instances where the user of the system 110 wishes to store their media on the cloud. The media storage system 124 manages all of the files stored within the cloud. This does not preclude the existence of the same files in other locations within the system. The system 110 also provides a module to manage user owned and managed storage 126. This module controls the PCD that resides at a location of the users choosing. The PCD is a separate device that works with the system to allow users to store files off the cloud, but manage them from within the system 110. Details of the PCD will be provided later in this submission.

Figure 1B:
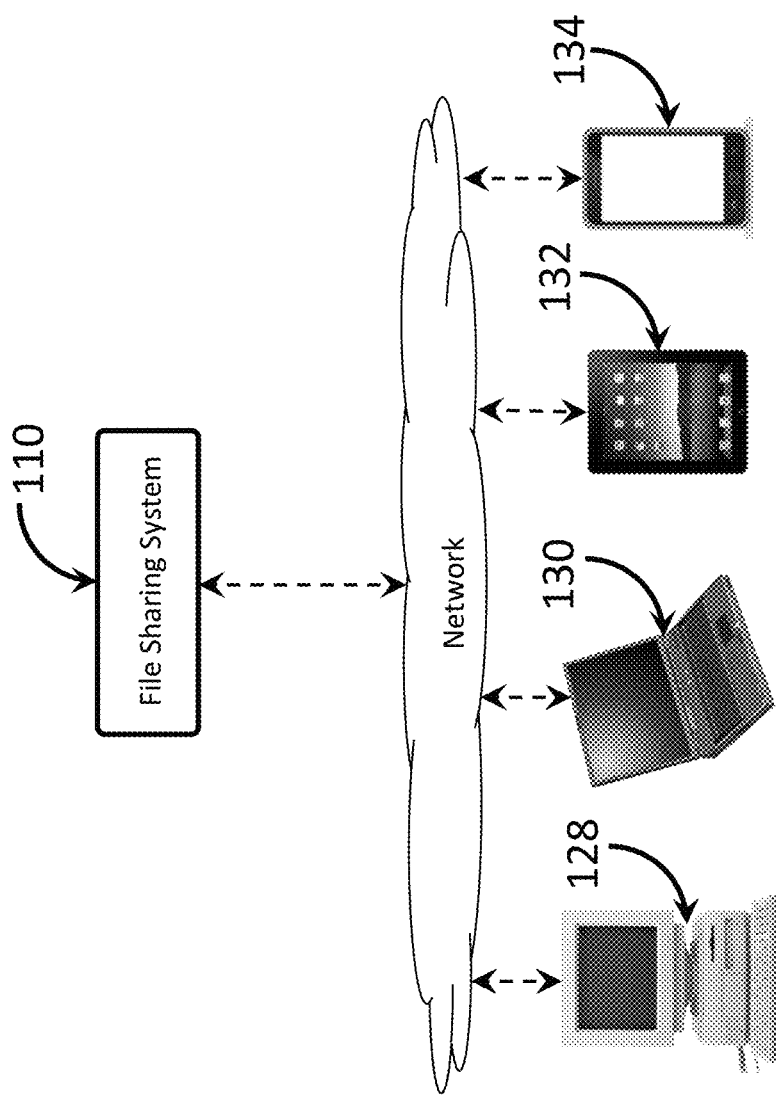
FIG. 1B is a block diagram illustrating an example implementation of the system when interfacing a network and interacting with a variety of generally known devices.

FIG. 1B is a block diagram showing how the file sharing system 110 is accessed by commonly known devices. In FIG. 1B, the file sharing system 110 is shown interfacing with a network. The network can be either public or private, and allows the transmission of commands from generally known devices to travel to and from the file sharing system 110. Generally known devices that can access the file sharing system 110 include (but are not limited to) desktop personal computers 128, laptop computers 130, tablets or pads 132 and smart phones 134. Commands received from any of these devices can access and manage files stored within the file sharing system 110.

Figure 2A:
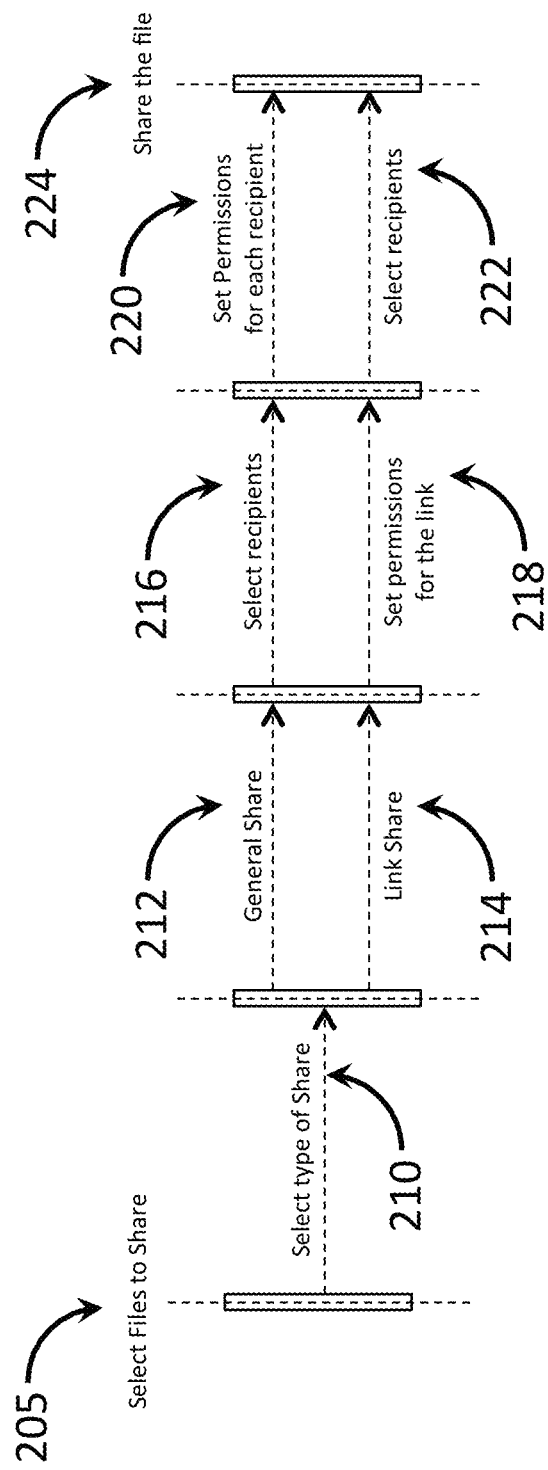
FIG. 2A is a flow diagram illustrating the general sharing methodology provided by the file sharing system.

FIG. 2A is a diagram that provides a general sharing methodology disclosed within the file sharing system. In all cases of media sharing, the general methodology disclosed on FIG. 2A will be implemented. There are other steps that may be performed in addition to those shown on this diagram. They will be disclosed later within this submission. In a typical sharing scenario, the user of the system will select media they wish to share 205. This can be a single piece of media such as a file, a group of media such as a folder, or a listing of media grouped from various locations within the system. Once the media is selected, the user then determines what type of sharing 210 they would like to perform. The sharing can be done either in a general share 212 method or a link share 214 method. The general share 212 allows the user to select a user (from the built-in contact menu or simply by typing their email address), while the link share 214 allows the user to create a specific link the media being shared. Links would generally be used in instances where you wish to email the materials to a group of people, whereas the general share provides a quick and easy way to share media with a single or multiple people. In cases where a general share 212 is desired, the user will select recipients

216 by either typing in email contact information into the system or by selecting them from a contact database within the system. The contact database can be modified as needed to provide all contact information necessary for the user to facilitate communications and sharing with friends, family, co-workers etc. At no time do any of these people need to be a user of the system. Media can easily be shared to anyone, regardless of whether or not they are users of the system. Once recipients are selected, the user then moves to the permission setting 220 step of the sharing operation. Available usage permissions will be disclosed in detail later in this submission. Once the usage permissions 220 have been determined for the recipient(s), the file can be shared 224.

In cases where the user wishes to incorporate a link share 214 as the preferred method of facilitating a share, the process varies. In the link share 214 method, a link to the file is generated from within the system. The user will select the media to be shared 205, select link share 214 and then set usage permissions 218 to govern the access to the link being shared. Unlike a general share where usage permissions for the media can be set based on the individual user receiving the media, the link usage permissions 218 are set for that particular link, and govern that links usage and distribution for all parties (recipients) of the share. Once the link usage permissions 218 are set, the recipients for the link can be selected. Since the link can be copied, the user can choose to distribute the link through the file sharing system, or they can simply open their personal email, IM, SMS or other communications program and send the link to their recipients in that fashion. Once the recipients 222 are selected, the user can share the link 224.

Once the type of share 210 is selected (either 212 or 214), the user can then select recipients for the share 216, set usage permissions and execute the share. Shares can be managed from any device that is capable of communicating with the file sharing system (as discussed previously) which include but are not limited to personal computers, laptop computers, tablets, pads and smart phones.

Figure 2B:
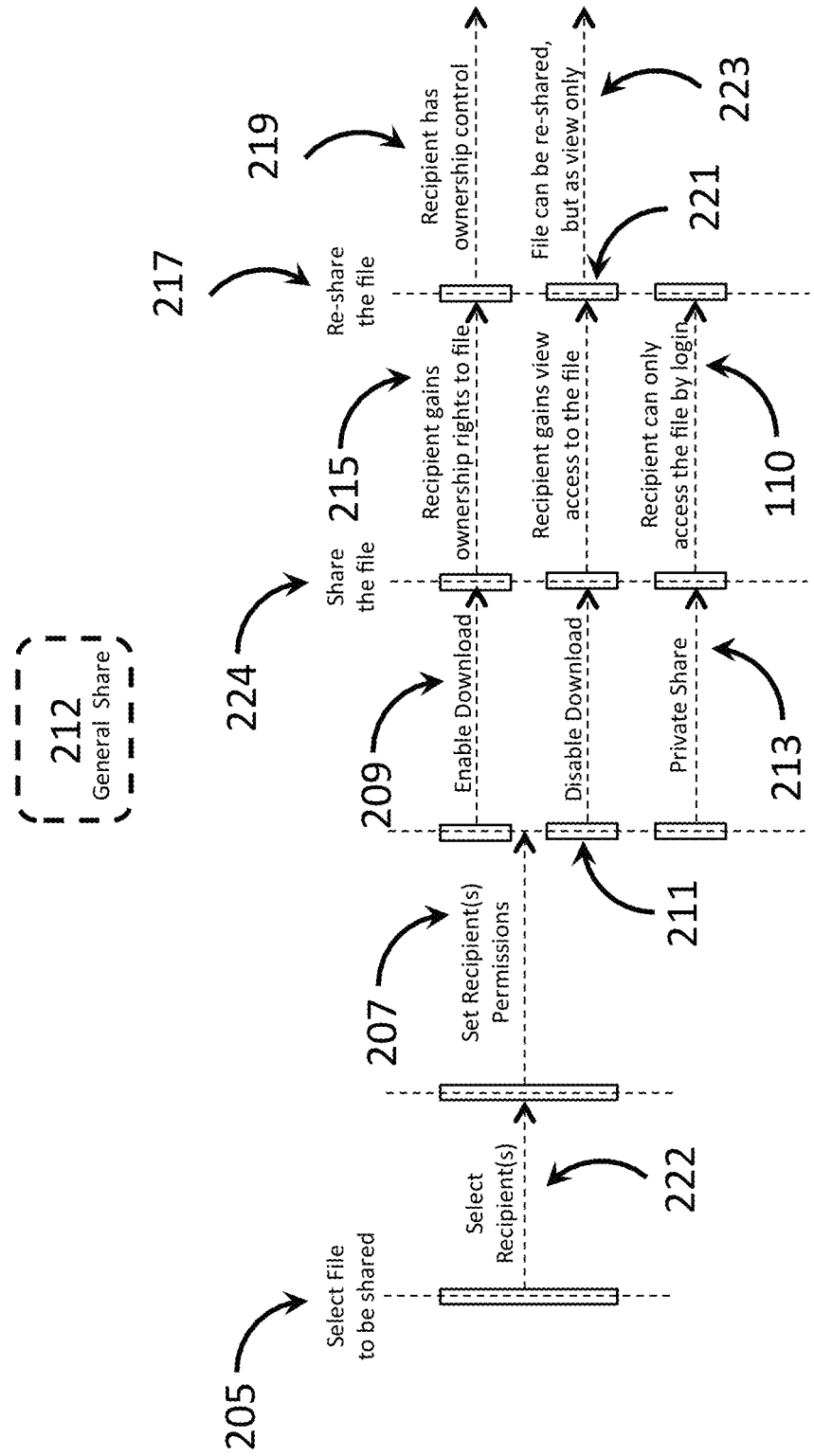
FIG. 2B is a flow diagram illustrating the permission methodologies associated with sharing files through the general share permission method.

FIG. 2B provides detailed information on the permission based sharing settings for the general sharing methodology 212. This sharing methodology is ideal for use in instances where a single file is to be shared with one or more recipients. To initiate the share process, select the file to be shared 205. Once the file is selected, recipients can then be selected 222. After the recipients are chosen, the user can now define individual file access usage permissions 207 for each user. Usage permissions that can be set include enable download 209; disable download 211; or private share 213. Each of these share usage permissions enables different attributes for the specific file, assigned to the user receiving the file. This allows the file sharing system to share the same file with multiple people, and assign different attributes to each share. By enabling this methodology of permission based sharing, the file sharing system negates the need for multiple copies of a file to be created to vary usage permissions by recipient.

In cases where the user wishes to enable the file to be downloaded by the recipient 209, the appropriate permission is chosen and the file can then be shared 224. Once the recipient receives the file, they gain full ownership rights to the file 215 since they have the ability to download it and take physical possession of it. They can then choose to re-share the file 217 with whomever they choose, and with whatever usage permissions they choose to implement. They now have all ownership privileges 219 of the file.

In cases where the user wishes to disable download 211 rights to the file being shared, the recipient will gain view-only 221 access to the file. When a share is initiated, the file sharing system creates a unique webpage to host the contents of the share. The recipient can then go to the unique web address to access the content being shared. If the user allows the shared file(s) to be downloaded, there will be a download arrow on the webpage next to the shared file(s). If the download is disabled, the arrow disappears and prevents the recipient from downloading the content. If viewing is enabled the recipient may view and/or play the file on the webpage even while being prevented from downloading the file. While they can re-share 217 the file with others, they do not have download permission, and therefore can only re-share the file 217 with read-only 223 usage permissions to the file. This type of share would be used in situations where the user wishes to share a file (e.g., a song) with others, but does not want the recipient to have ownership rights to the file.

Another method of sharing provided by the file sharing system is called a private share 213. In this methodology, the recipient of the file must actually log into the file sharing system 110 to access the file being shared. This method is provided for sharing files in a very secure environment. The recipient of the private share 213 cannot forward the file or download the file. They have view only rights to the file, and can only access it by logging directly into the file sharing system 110. If the recipient of the private share 213 does not have an account, they can create one for free to allow them access to the file sharing system 110.

Figure 2C:
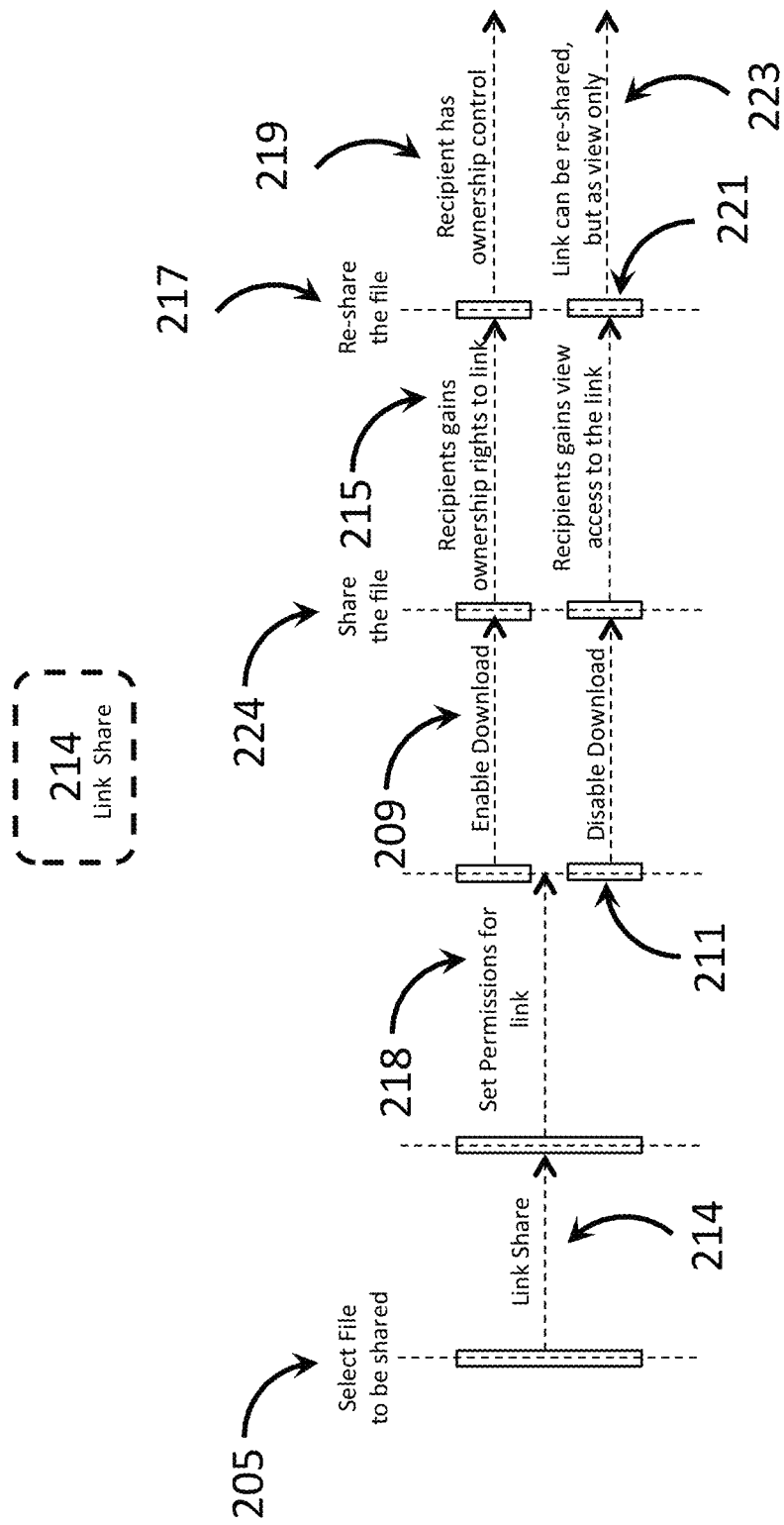
FIG. 2C is a flow diagram illustrating the permission based methodologies associated with sharing files through the link share permission method.

FIG. 2C provides detailed information for the Link Share Permission Methodology. The file sharing system provides a link share 214 capability that is designed to allow the user to create a link to a specific file, folder or list within the file sharing system for the purpose of utilizing an outside communications method for delivering the share. Methods such as email, SMS, chats, Instant Messages and other text based communications methods. The user will create a link to the file, assign the associated usage permissions, copy and paste the link into their communications medium and the share the link.

Unlike general share discussed earlier in this submission, the usage permissions assigned in Link Share follow the link, and not the individual receiving the share. This means that the usage permissions assigned to the link will apply to all recipients of the link.

Link Share will now be discussed with reference to FIG. 2C. As with other share methods discussed, the user must first select a file 205 or group of files they wish to share. Once the file(s) 205 has been selected, the user will now select link share 214. Upon selecting 214 link share, the system then allows the user to set a permission 218 for that particular link. The usage permissions available are enable download 209 or disable download 211. These are the only two usage permissions available to govern link share 214. If the user chooses to enable download 209, and shares the file 224, the recipients of the file gain ownership rights 215 to the file. This means that all recipients of that share can download and take ownership of the files associated with the link that has been shared. They can choose to re-share 217 that link and assign whatever usage permissions they choose to assign 218. If no usage permissions are set during the re-share 217, then the default of enable download 209 remains intact.

If the user chooses to disable download 211 during the link share 214 process, then all recipients of the share will gain view only 221 access to the file. The link can be re-shared 217, but it will retain the view only 223 rights associated with it.

It's important to note that user (creator of the original file link 214) can choose to delete it. If this link is deleted, all of the associated shares beyond the initial link share 214 are now broken and can no longer be accessed. Only recipients who downloaded the file will have access to it because the original link has been terminated. There are no time restrictions on terminating a link. The user can terminate a share (any share) at any time of their choosing.

Figure 3A:
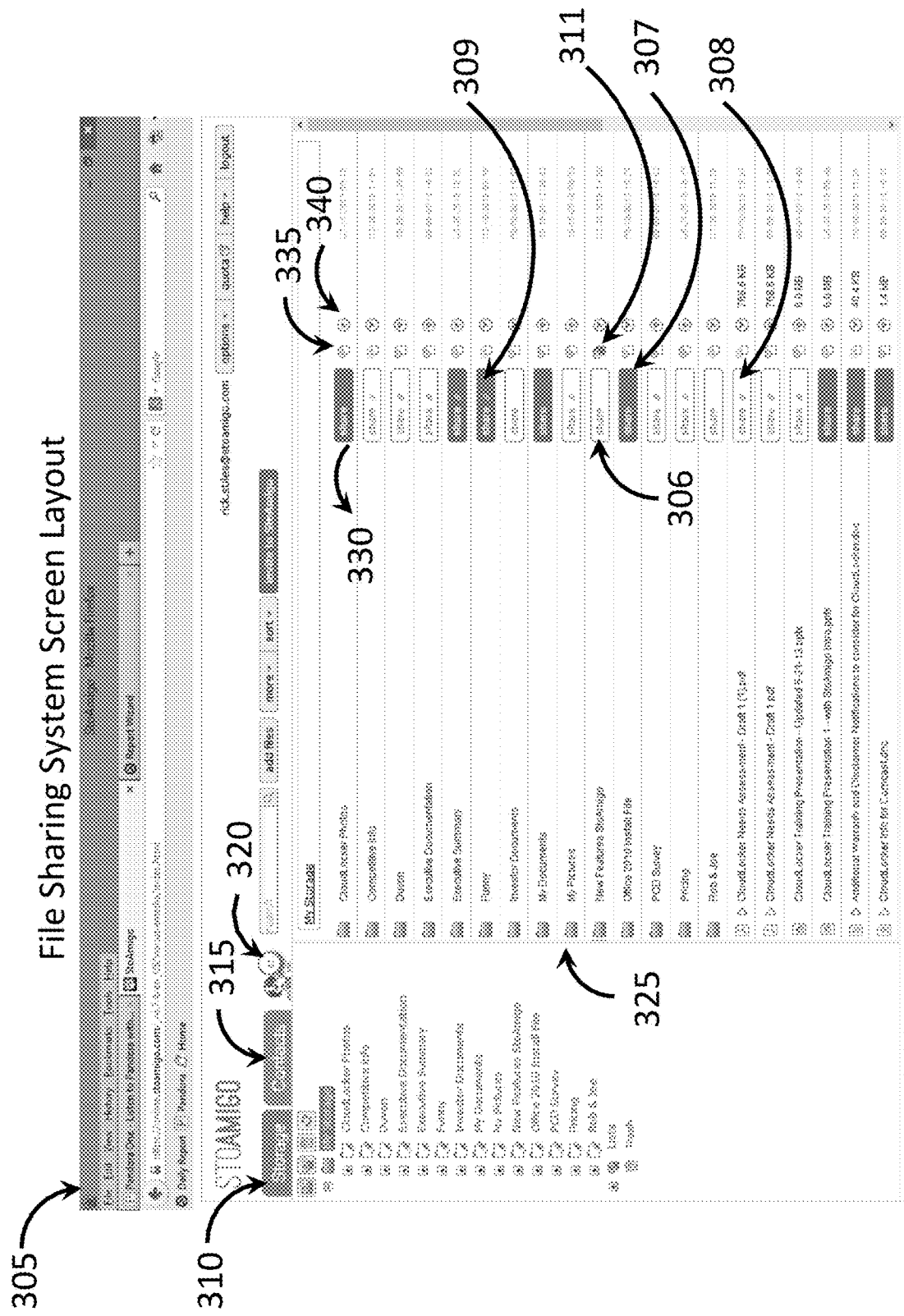
FIG. 3A illustrates a screen from the file sharing system having typical commands and management tools.

The details of the file sharing system management tools and controls will now be described with reference to FIG. 3A. FIG. 3A shows the file sharing system screen opened up in a typical generally known web browser 305 window on a personal computer. In this example, the browser is FireFox. The screen contains a variety of options, but our discussion will focus on those specific to this submission. FIG. 3A shows a Storage 310 tab and a Contacts 315 tab. The Storage 310 tab opens a window (shown) that provides file and directory structure. The Contacts tab 315 opens a window (not shown) that provides a contact list where the user can add/remove and share to specific contacts or groups of contacts. FIG. 3A also shows the notifications 320 icon, where the user can access detailed system notifications (to be discussed in detail later in this submission) as well as a file menu windows 325. To the right of the file menu 325 window are a series of control buttons and pull down menus to manage the sharing capabilities of the file sharing system. These are the share 330 button, the list 335 button and a pull down menu 340 for additional file management tools such as renaming and deleting a file. As can be seen on the file sharing system Layout Screen FIG. 3A, the share 330 button appears next to each file and each folder available in the system. This allows the user to easily share either files, folders or both. In addition, each file or folder can be added to a list 335. This will be covered in detail later in this submission.

Visual share indications are provided on each file screen within the system. Once a file or folder has been shared, the share icon changes. Specifically, it shows up as being filled in as opposed to just an outline of the button. As shown in FIG. 3A, share button 306 is blank or not filled in, indicating that this file or folder has not yet been shared. Reference 307 is filled in as an indication that folder or file has been shared. Reference 308 shows a "link" icon inside the share icon as an indication that a link has been created and shared with respect to the associated file or folder. Reference 309 serves as an indication that the file or folder has been shared, and has additionally been shared via link. Reference 311 shows the "list" icon filled in as a positive indication that the associated file or folder has been added to a list. Additional sharing indications can be found in the contacts menu of the System.

Figure 3B:
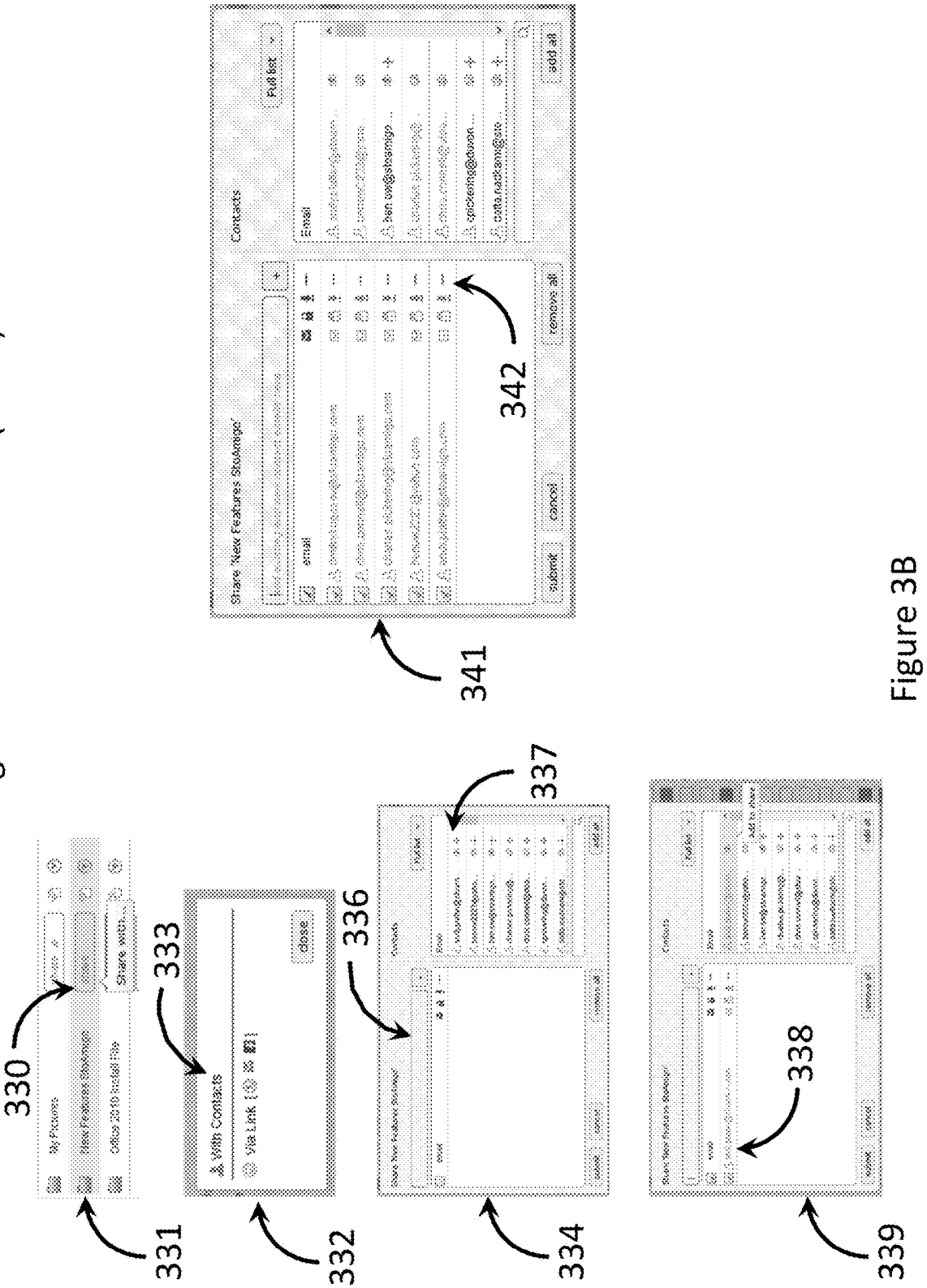
FIG. 3B illustrates screens showing the steps taken to perform a general sharing function.

FIG. 3B shows the progression of a share that is controlled by the share 330 button. Please refer to FIG. 3B now. In this example of a general email share progression, we will be sharing a folder 331. The same steps would apply to sharing a single file or other individual piece of media. Upon engaging the share 330 button, a pop-up menu 332 appears. We will be selecting with contacts 333 to initiate a general share. Once the "with contacts" 333 button has been selected, an additional pop-up window 334 will appear, revealing the user's contact list. While there are other ways within the system to access this list 334 (as shown on FIG. 3A, 315) we will be focusing on this access method for the current example. The contact list 334 shows existing contact names that the user has already entered into the system. Should the user choose to share with someone not existing in the contact list currently, they can simply type the email address of the user in the provided window 336 and the name will automatically be added to the contact database 334. From the contact list 334, the user can now select people he would like to share the selected folder 331 with. To select recipients of the file 331, the user will click the plus sign 337 next to the name of the contact that appears in the list on the right of the contact list 334. As illustrated in this example, the plus sign 337 next to the first name on our list was selected and now appears on the left side of the window 338 in diagram 339. The user can continue to add recipients in this manner until all recipients have been selected as shown in diagram 341. Should the user choose to remove a recipient from the share at this time, it can be done by simply clicking the minus sign (−) 342 next to the name of the recipient.

Figure 3C:
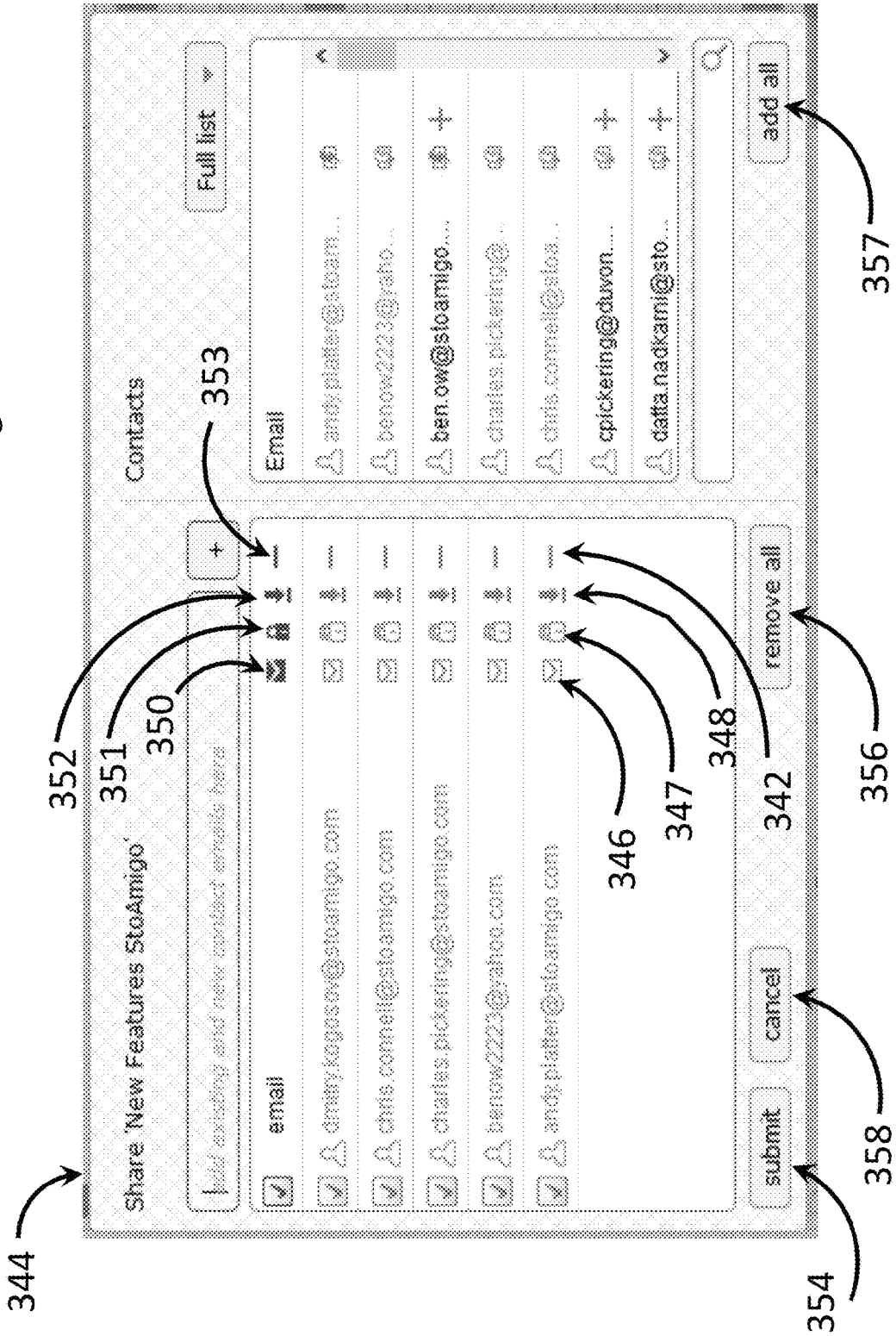
FIG. 3C illustrates a screen showing the steps taken to set permissions for file sharing.

The General Share Permission Settings will now be discussed with reference to FIG. 3C. FIG. 3C shows an expanded view of the contact list 334. We've now added all of the recipients to our share in the previous discussion (FIG. 3B). Now we can set usage permissions for each recipient. The permission settings appear next to the recipient email information. As shown in the contact list 344, each recipient has 4 icons next to their name. These icons are a personal message icon 346, a lock icon 347, a download icon 348 and a minus sign 342. The personal message icon 346 allows the user to enter a personal message to the recipient of the share. By clicking on the personal message 346 icon, a second window opens (not shown) where the personal message can be entered. Once a personal message has been added, the icon 346 will fill in (i.e., darken) as an indication that a message has been added. If the user chooses to add the same personal message to all recipients, they can use the master personal message icon 350. This will allow the user to enter a message and have it sent to all recipients. The lock icon 347 makes the share private, which requires the recipient of the share to log into the File Management System to see the file that was shared. The lock icon 347 (private share) prevents the recipient from doing anything with the file received other than viewing it. It may not be downloaded, forwarded or re-shared. The master lock icon 351 is provided to allow the user to set the same usage permissions for all of the recipients at the same time. The functionality of this icon is identical to the functionality of the lock icon 347, except that it controls all recipients of the share. The download icon 348 is provided to allow the user to set download usage permissions for the file being shared. As pictured in FIG. 3C, 348 is currently filled in (i.e., darkened) indicating that the file can be downloaded. If the user clicks on the download icon 348, it will change the state to non-downloadable. This will make the icon 348 appear as an outline only (i.e., hollow). The master download icon 352 is provided to allow the user to set all of the download usage permissions for each recipient at the same time. As discussed in the previous slide, the minus sign 342 allows the user to remove a recipient from the share. Recipients can be added or removed at the users discretion. The master minus sign 353 is added to allow the user to remove all of the recipients from the share at the same time. An additional button with like functionality (356 remove all) has also been added to minimize confusion. Once all of the selections have been made, the user can select submit 354 which will complete the share of the folder we selected. If the user decides to terminate the share operation, they can simply select cancel 358. The user can also choose to add everyone from their contact list to the share by selecting the add all 357 button. Once the submit 354 or cancel 358 buttons have been selected, the contact list 344 will close, returning the user to the previous screen (FIG. 3A).

Figure 4A:
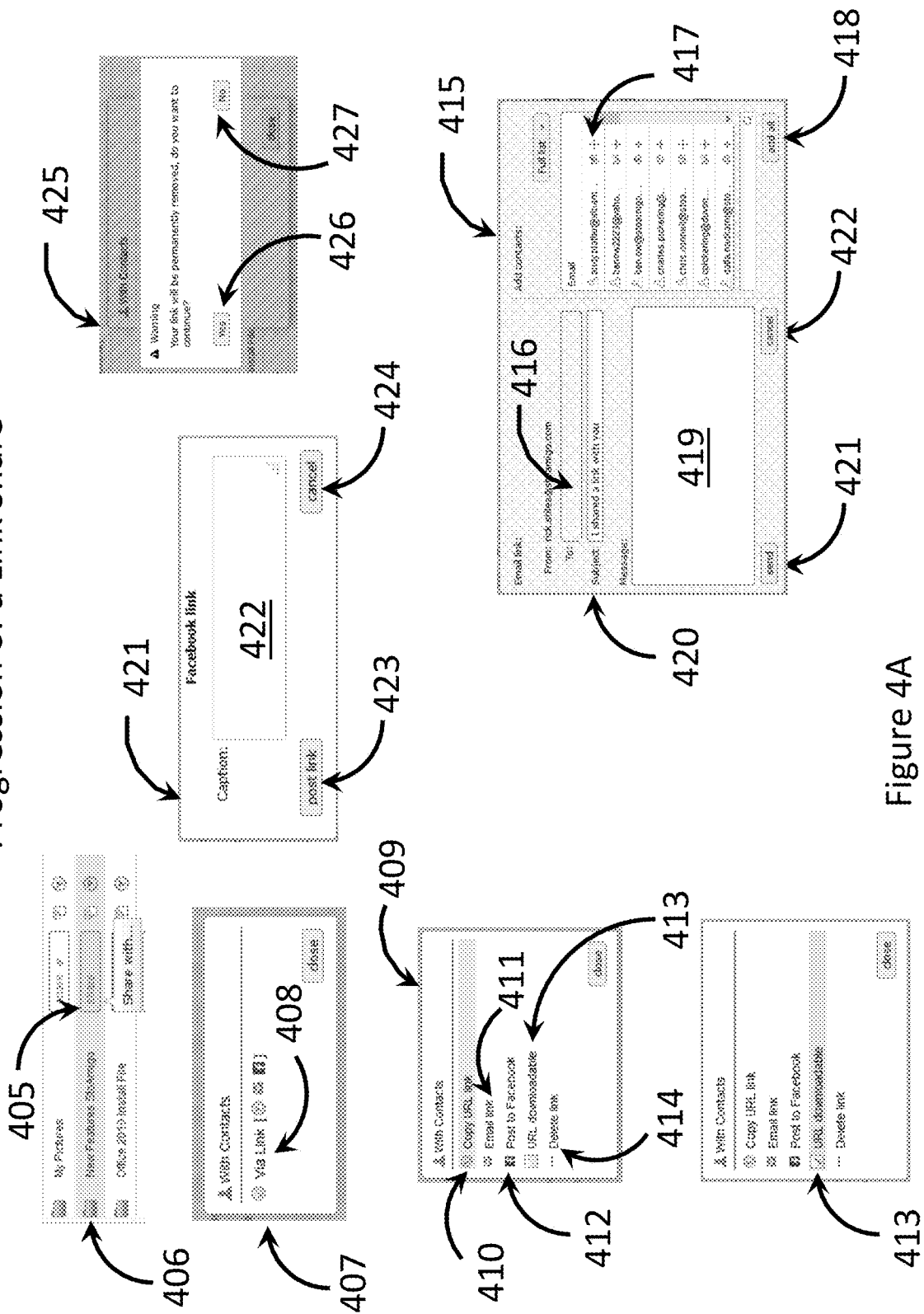
FIG. 4A illustrates screens showing the steps taken to share a link.

The Link Share detailed progression (reference 214 from FIG. 2C) will now be discussed with reference to FIG. 4A. For the purpose of ease of explanation, we will share the same folder used in the previous example (FIG. 3A through FIG. 3C). Please refer to FIG. 4A now. The user initiating the share will click the share 405 button as shown in FIG. 4A to initiate the share process. This opens a new window 407 where via link 408 can be selected. Icons on the 408 via link command indicate links to be the preferred method of sharing with social sites such as Facebook. Once via link 408 is selected, a new window 409 appears. At this point, the user can choose to copy the URL link 410, email the link 411, post the link to Facebook 412, make the link downloadable 413 or delete the link. If the user choses 410 copy the URL link, a message (not shown) will appear letting the user know the link has been copied. They can now paste that link in any document, browser window, chat window or other eligible medium of their choice. The link will provide the unique identification address of the folder 406 being shared. At any time before, during or after the folder has been shared, the user can choose to make the URL downloadable 413. Making the link downloadable will put a checkmark in the box 413 next to the description URL downloadable. Deselecting the URL downloadable 413 will remove the checkmark. The checkmark is a visible indication of the downloadable status of the link. As mentioned previously, the URL download 413 applies to all recipients of the link being shared.

Selecting email link 411 will open a new pop-up window 415 that brings the user back to the contact list 344 on FIG. 3C. Since this is a link share 408, the contact list does not provide usage permissions for the individual recipients 342, 346, 347, 348, 350, 351, 352 as shown in FIG. 3C. The permission for the link (URL download 413) is shown on diagram 409. This is the only permission setting available for a link share 408. In pop-up 415, the user can enter recipients either by typing their individual email addresses into the space provided 416, or by clicking the plus sign (+) 417 next to the name of the recipients shown in the contact list 415. The user can additionally choose to add all of the contacts in their list by selecting the "add all" button 418. As users are added to the link share, they will appear in the window 419 provided. As with the previous sharing methods, recipients can be subtracted from the share by clicking the minus sign (342 on FIG. 3C) next to their names, once they appear in the window 419. The user also has the option of changing the subject 420 line of the email to anything they desire. Once recipients and the subject 420 are completed (if desired), the link can now be shared with all recipients by clicking the send 421 button. The entire process can be terminated at any time by pressing the cancel 422 button. Once the user selects send 421 or cancel 422, the pop-up window 415 will close, returning the user to the file sharing system Screen (FIG. 3A).

The user can choose to post their link to Facebook by selecting post to Facebook 412. This action will open a pop-up window 421 that will give the user the option to add a caption 422 to the link by typing the caption into the space provided 422, post the link 423 or cancel the operation 424. Selecting post link 422 will take the user to their Facebook login hosted by the Facebook website (not shown). If they are not logged into their account, they will be prompted to do so. If they are logged in, the link will post immediately upon selecting post link 423. This capability is significant since it allows the user to post to Facebook while bypassing the upload requirement for the media being posted. This ensures that the user keeps control of their file since a copy of the file is never uploaded to the social network site (e.g., Facebook). When the file is taken off the social network site by the user, the file is gone and does not exist on the site or any of its associated backup sites.

The final link control selection provided on 409 is the delete link 414 command. The delete link 414 command can be executed any time after the link is shared by selecting delete link 414. This action will open a pop-up window 425, warning the user that they are about to delete a link to the shared folder 406. If they choose to proceed with the link deletion, they can click yes 426, which will immediately delete the link, and provide a confirmation message (not shown) confirming the deletion of the link. If the user selects no 427, the pop-up 425 will close, returning the user to the pop-up 409 to continue control of the link commands. It's important to note that once a link is deleted, it is deleted for all shares and posts associated with that particular link. This makes it simple for a user to permanently and immediately delete something from every share, regardless of when the link share was originally established.

The List Creation and Sharing features will now be discussed with reference to FIG. 5. The file sharing system provides a feature that allows users to create and share lists of their favorite files (e.g., pictures, songs, videos, recipes, files, folders, documents, etc. . . . ) The List Sharing feature enables the user to create a list of multiple files or folders for the purpose of sharing large quantities of files easily, while negating the need for the files to be moved to specific folders or other locations within the file sharing system. The List Sharing feature is particularly suitable in applications where a user wishes to share a list of songs or a list of videos with a friend or group.

Figure 5A:
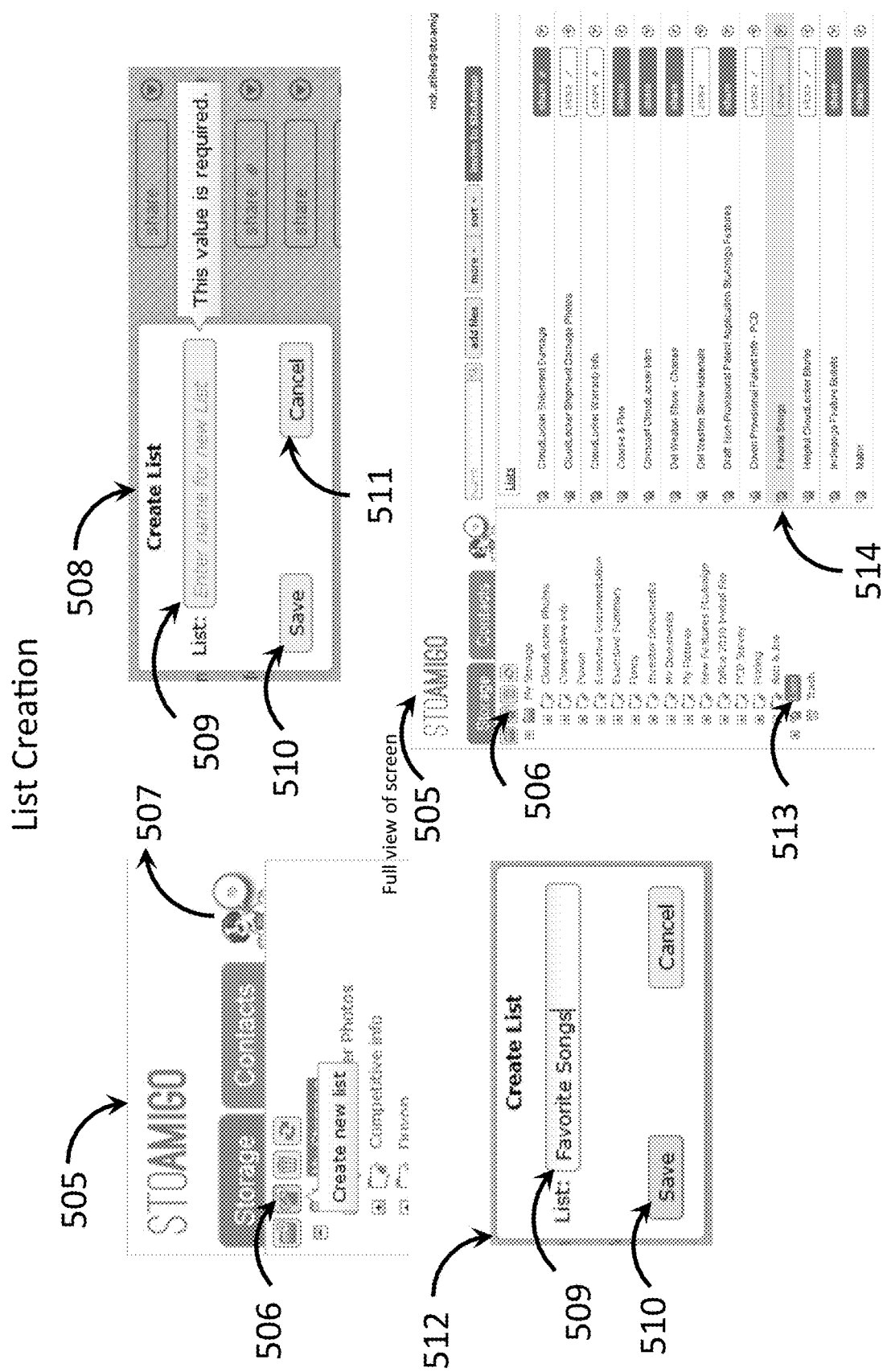
FIG. 5A illustrates screens showing the steps taken to create a list of files for sharing.

FIG. 5A illustrates one method for creating a new list in the file sharing system. Please refer to FIG. 5A now. While other methods do exist for list creation within the system, this method was selected for the purpose of ease of explanation. Diagram 505 (shown top left-hand corner) is a zoomed in view of the file sharing system main screen 505 (shown bottom right). The file list creation icon 506 can be selected to initiate the creation of a new list. Once the file list creation icon 506 is selected, the Create List 508 pop-up window opens. In the Create List window 508 the user has the choice of entering a name for the new list 509 and saving the list 510, or can cancel the operation 511. In diagram 512, we've put the list name "Favorite Songs" into the "enter name for new list" 509 window and hit the save 510 button. Once the save 510 button or the cancel 511 button is clicked, the screen returns to the beginning screen 505. Looking now at the main screen 505 (shown bottom right-hand corner of FIG. 5A) the newly created "Favorite Songs" 514 list appears in the list directory 513 of the main screen of the file sharing system. Icon 507 is the notifications menu, to be discussed later in this submission.

Now that a list has been created within the system (as illustrated in 5A above), the list can now be populated with files for the share. The method for adding and removing files from a list will now be described with reference to FIG. 5B.

In this example, we will be adding files to the list (Favorite Songs 509) that was created in the reference above using FIG. 5A. On FIG. 5B, the user begins from the file sharing system main screen 505 and navigates to the location of the files 515 they wish to add to the list. Once the user has selected the proper file location 515, the files will appear in the window 516. At this point, the user can choose the files they wish to add to the list by selecting the list icon 517 next to the file they wish to add. Once the file is selected using the list icon 517, a pop-up window 518 appears. This window 518 gives the user the option of creating a new list 519 to add the file to, or to 520 select an existing list from the menu. In this example, we've chosen to add the file to the list 509 shown in the window 518 that appears among the other lists we've created previously 520. Once selected, the pop-up can be closed 521, returning the user to the file sharing system main window 505. At this point, a visual indication that the file has been added to the list 522 appears next to the selected file. The list icon 522 now appears filled in.

Figure 5B:
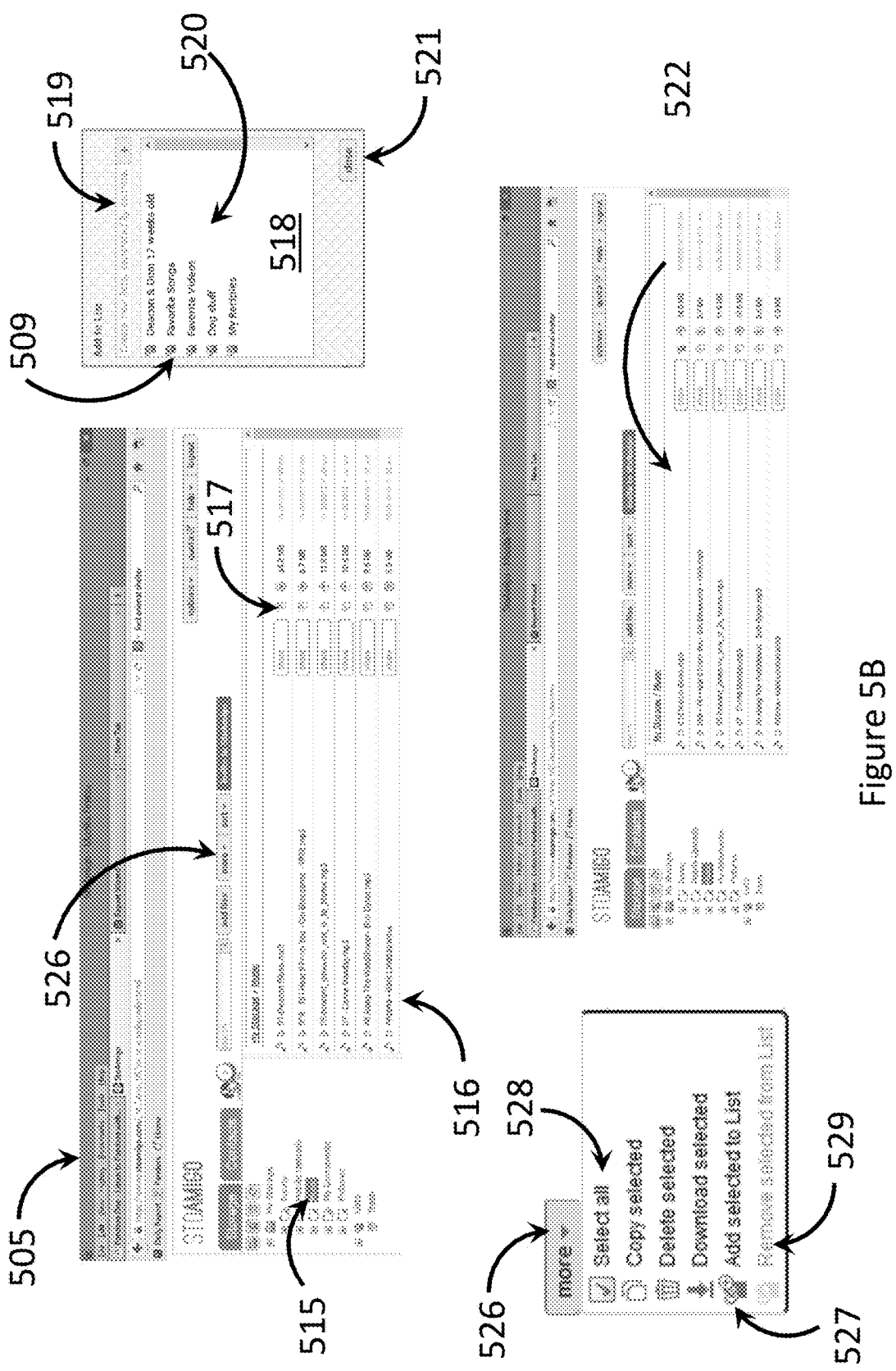
FIG. 5B illustrates screens showing the steps taken to add files to a list for sharing.

Multiple files can be added to a list simultaneously by holding the [CTRL] button on your keyboard and left+click on the mouse button to select the files. Similarly, the user can hold down the shift key and select multiple files. Once the files are selected, the user can open the More menu 526 and select 527 Add selected to List. This will place all of the selected files into the list the user is working with (in this case "Favorite Songs" 509). Additional file management commands are available on the More menu 526 including Select All 528 that allows the user to select all files within the given folder. The user can additionally remove specific files from a list by simply selecting the files and then engaging the More menu 526 and selecting 529 Remove selected from list. In FIG. 5B, the 529 Remove selected from list is grayed out because the files we've chosen do not currently exist on a list. If they did, the text would appear black as the other menu selections in 562. While other menu commands exist, they are typically known and are not discussed in this submission.

The Personal Cloud Device (PCD) 630 is an extension of the file sharing system that acts as a local repository for the user files to be stored. While the PCD 630 is not required for operation of the file sharing system, it is provided as an optional item that allows the user to store their files locally, while utilizing all of the features and functions of the file sharing system. The PCD 630 is particularly well suited for use in applications where the user is hesitant or does not wish to store their personal files on the public internet, or the cloud.

Figure 6A:
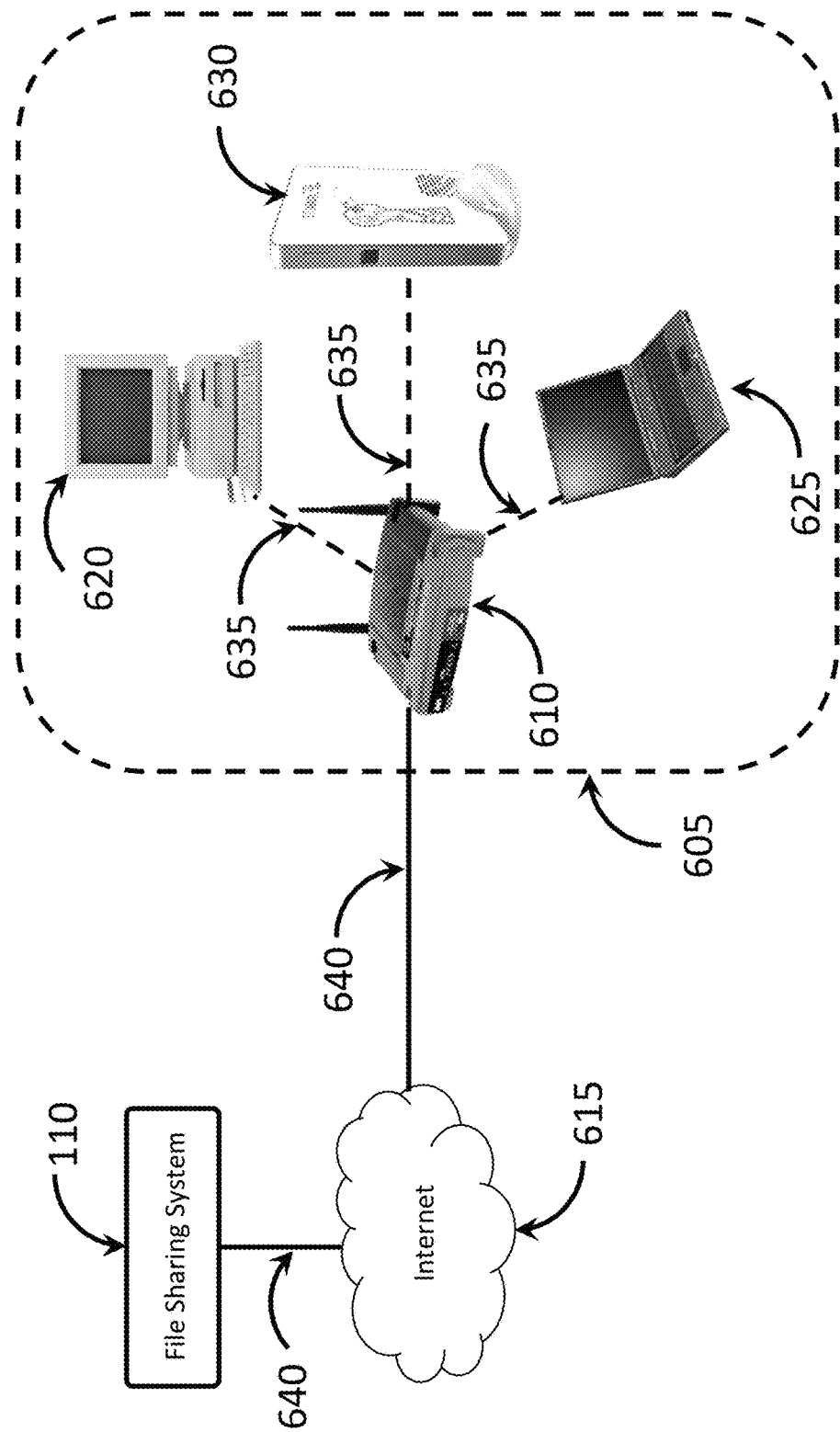
FIG. 6A is a block diagram illustrating the Personal Cloud Device (PCD) interconnected to a LAN.

FIG. 6A is a simplified diagram representing the network elements of a typical LAN 605 (Local Area Network) configuration, and how Personal Cloud Device (PCD) 630 is deployed by the user. As with any LAN location, 605 can be at a home, office or other location of the users choosing. For the purpose of this explanation, we show generally known devices associated with the LAN 605. The first device is a typical modem 610 to interface with the public network (internet). The modem 610 in this representation can function in both a wired and wireless environment, and provides hub functionality for the LAN 605. In this example, generally known devices like a personal computer 620 and a laptop computer 625 are utilizing the modem 610 to interface with the public network 615, in this case, the internet. In addition to these devices, a PCD 630 has also been connected to the LAN 605 through the modem 610. Each of these connections 635 can be either wired or wireless.

Outside of the users LAN 605, the modem 610 is connected to the internet through a typical cable facility 640. The file sharing system 110 is also connected to the internet 615, to enable interaction with the LAN 605 and the associated devices 620, 625 and 630.

Figure 6B:
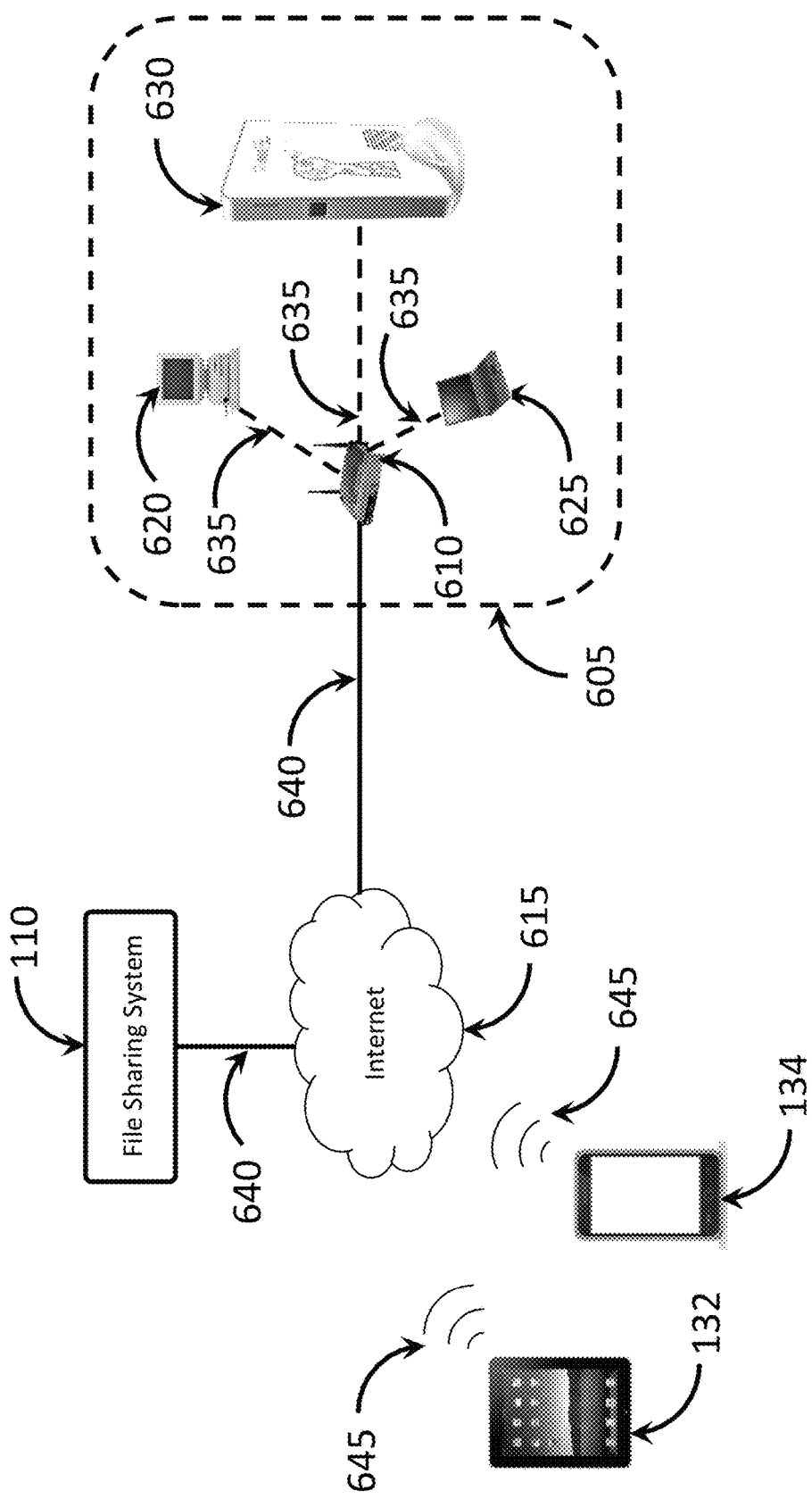
FIG. 6B is a block diagram illustrating the PCD showing remote access capability.

FIG. 6B is a diagram illustrating how the PCD interacts with the File Management System and remote or portable devices.

The function of the PCD will now be discussed with reference to FIG. 6B. The PCD 630 interfaces the file sharing system 110 through the local area network 605 LAN and through the public network 615. The file sharing system recognizes the 630 PCD upon connection to the user account. Once this connection is established, the user can begin to use the PCD 630 to store their files. Files can be uploaded from any of the generally known devices shown in FIG. 6B. These devices include but are not limited to personal computers 620, laptop computers 625, tablets 132 and smart phones 134. Portable devices such as laptop computers 625, tablets 132 and smart phones 134 can access the PCD 630 from anywhere they can obtain internet access. Wireless internet access 645 can facilitate connections to portable smart type devices 132 & 134.

Command protocol used by the file sharing system 110 is identical whether the PCD 630 is present and in use on the users network or not. This transparency of operation eases the learning curve for the file sharing system 110, and allows users to implement the same commands, regardless of where they gain access to the file sharing system 110.

As shown in FIG. 6B, the PCD 630 is now connected to the users LAN 605. At this point, the user can log into their file sharing system 110 using a generally known device available on the LAN 605 such as a laptop 625 or desktop PC 620.

Figure 6C:
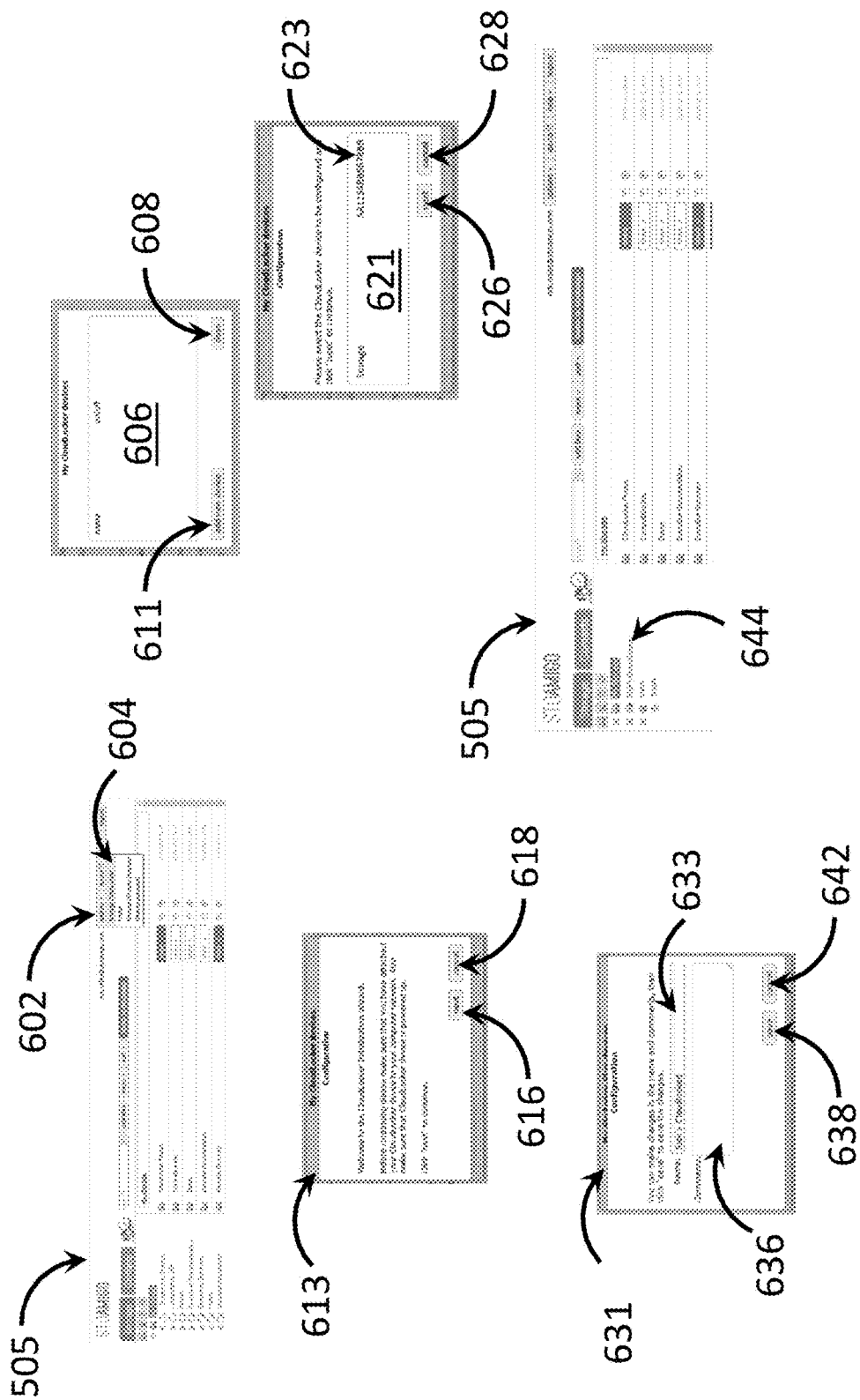
FIG. 6C illustrates screens showing connection of the PCD to the file sharing system.

The steps for connecting the file sharing system 110 with the Personal Cloud Device 630 (PCD) will now be described using FIG. 6C. FIG. 6C assumes the user is now utilizing a generally known device 620 or 625 at this point to facilitate communications between the file sharing system 110 and the PCD 630.

Connecting the PCD 630 to the File sharing system 110 will now be discussed with reference to FIG. 6C.

FIG. 6C shows the user starting at the home screen 505 of the file sharing system. From the home screen 505, the user can select the options 602 menu, and then manage Cloud-Locker 604. Once manage CloudLocker 604 is selected, a pop-up window 606 appears. This window will list existing PCD devices in the space provided, as well as offer the user the opportunity to add a new device 611 or to cancel 608 the operation. If the user chooses to cancel 608 the operation, they will be immediately returned to the home screen 505. If the user chooses to add a new device 611, they will be taken to pop-up window 613.

Pop-up window 613 is a system configuration helper that is designed to walk the user through the process of adding a new PCD to their file sharing system. The user can choose to cancel 618 this operation at any time, which will return them to pop-up 606. Should the user choose next 616, their PCD configuration session will continue.

Selecting next 616 brings up an additional pop-up window 621. This window will show the user all of the PCD devices currently attached to the LAN, by providing the device's unique MAC address 623. Once the user identifies the device 623 they wish to connect to their file sharing system, they can simply select it by clicking on the device 623 they wish to add. Once selected, the user can choose to continue the process by selecting next 626. As with previous screens, the user can, at any time during this process, choose to cancel 628. This action will return the user to the previous screen 613.

Once the user selects next 626, a new window 631 will appear. Pop-up window 631 offers the user the option of giving their PCD device a name 633, as well as a description 636. In this example, we've named the device 633 "Rick's CloudLocker." At any time during this step, the user can choose cancel 642, returning them to the prior pop-up 621. If the user chooses to save 638, the name (Rick's Cloud-Locker) will be saved and the user will be returned to the home screen 505. The newly attached PCD device will now appear in the file menu 644. At this point, the device can be used to store and share all of the files the user chooses. The PCD will appear and act just like any other file folder within the file sharing system.

Figure 7A:
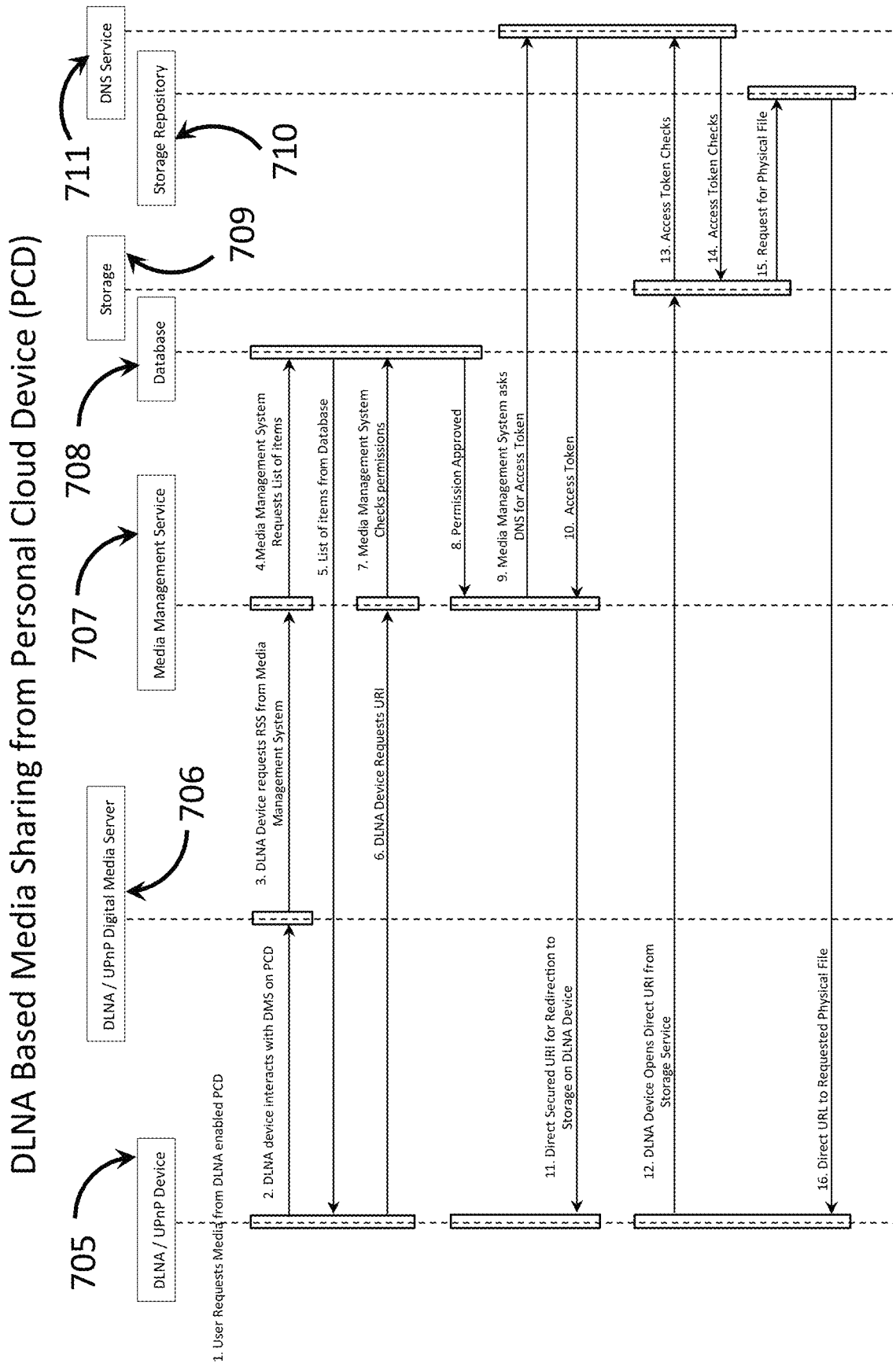
FIG. 7A is block diagram showing the typical progression of a DLNA media request being sent from a to the file sharing system.

The file sharing system allows DLNA (Digital Life Network Alliance) compatible TV's, DVD players, Video Game devices and other appliances to interact with the system for the purpose of displaying video on a local device that is stored on the PCD. FIG. 7A provides a step-by-step diagram of a typical implementation of the DLNA feature as it relates to the PCD. Please refer to FIG. 7A now. In this figure, we will be discussing the process of requesting a list of information from the PCD for display (streaming) on the DLNA enabled device (e.g., TV or other). The process starts with a user request being sent to the DLNA enabled PCD from an external source. The DLNA UPnP device 705 (user TV or other DLNA enabled device) receives and interprets the request (step 1) from the user. The user request then travels to the PCDs internal digital media server 706 (step 2). The DLNA UPnP device 705 interacts with the Digital Media Server (DMS) 706 on the device to interpret the command being executed. The Digital Media Server allows the RSS (Really Simple Syndication) information received from the DLNA device 705 to forward to the Media Management Service 707 (step 3). At this point, the Media Management Service 707 requests a list of media from the Database 708 (step 4). The Database 708 returns a list of items (step 5) to the DLNA device 705 which will appear on the viewing screen of the device 705 (typically a list of media available on the PCD). The DLNA UPnP device 705 now sends a request for a Uniform Resource Identifier (URI) to the management service 707 (step 6). The media management service (707) then verifies that the user making the request has the appropriate usage permissions to access the material (step 7). The database 708 verifies and issues permission approval (step 8) which is returned to the media management service 707. The media management service 707 now sends a request to the DNS service 711 for an access token (step 9). This token will grant the user access to the media being requested through this process. The DNS 711 service returns the access token to the media management service (step 10). Upon receiving the token, the media management service 707 initiates a direct secured URI redirection to the DLNA UPnP 705 device (step 11). This allows the DLNA device 705 to gain access to the secured storage device 709 (step 12). As the storage device 709 receives the direct URI from the DLNA UPnP device 705 (step 12), the storage device 709 verifies the access token with the DNS service 711 (step 13). The DNS 711 validates the access token (step 14) allowing the storage device 709 to submit a request to the storage repository 710 for access to the physical file being requested (step 15). Since all validations and tokens have been authenticated and verified throughout the process, the user receives the direct URI access to the file being requested (step 16). The file is returned to the DLNA UPnP device 705 and is now visible on the viewing screen of the user device (TV or other).

Figure 7B:
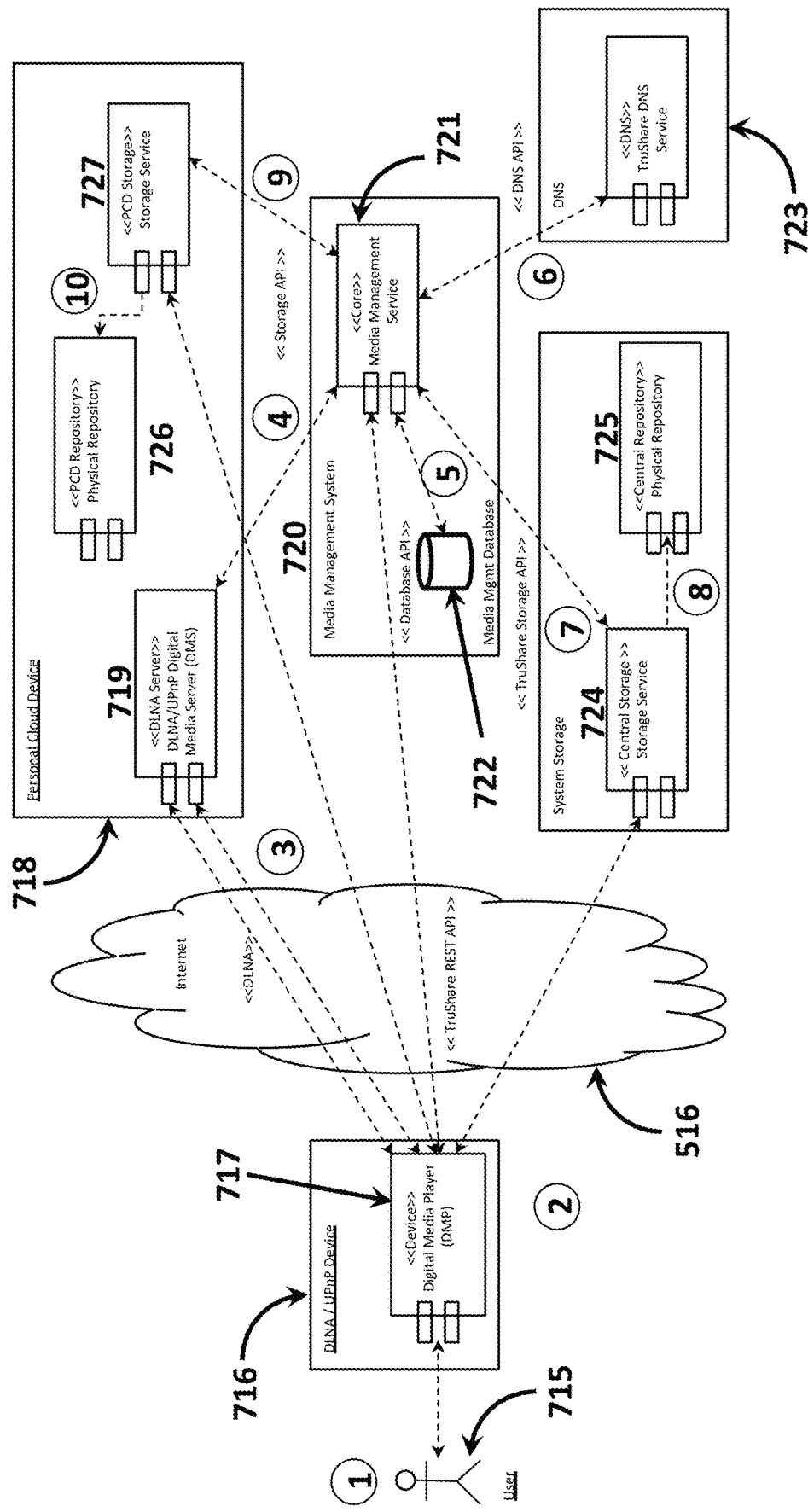
FIG. 7B is a block diagram showing the signal path sections and components associated with the DLNA sharing.

FIG. 7B is a physical block diagram of the components associated with the process that was previously detailed in FIG. 7A. FIG. 7B serves to show the communication paths for the interaction between the user, their DLNA device (e.g., TV, Media Player or other) and the PCD. Please refer to FIG. 7B now.

FIG. 7B illustrates a typical example environment where a user 715 interacts with their DLNA enabled TV or other device 716 (step 1). The user 715 sends a request to the DLNA device 716 for media that is stored on the PCD. The request typically goes through the device's internal digital media player (DMP) 717. The DMP 717 sends the query associated with the user request to the digital media server 718 (step 3). As can be seen in FIG. 7A, this request travels across the public network (e.g., internet) to reach the device. Even though the PCD is in the same location as the user in this representation, the authentication process requires that the file sharing system validate the user, and the subsequent access to the PCD. The Digital Media Server 719 within the PCD 718 receives the query (step 3) from the digital media player 717. The DMS 719 queries the media management system 720 for information concerning the media being requested by the user 715 (step 4). The media management service 721 within the system 720 queries the media management database 722 (step 5) to find the location of the media being sought. The media management database communicates with the DNS service 723 to provide the location of the media. The DNS service 723 returns the information being sought to the media management system 721 (step 6). The media management system 721 then communicates with the central storage service 724 (step 7) which sends a message to the physical repository 725 where the data resides (step 8). If the media being sought resides in the physical repository 725, the media will be returned to the PCD 718 through the media management service 721 (step 9). If the media resides on the PCD in the physical repository 726, then the media management database 722 will notify the media management service 721 of the physical location of the data, and the PCD storage service 727 will pull the media from the physical repository 726 (step 10). The requested media is then returned to the user from either the PCD storage service 727 or through the central storage service 724, depending on where the content resides.

While the device has been described in terms of specific embodiments, those skilled in the art and/or profession will recognize that the device specifications can be practiced with modifications in the spirit and scope of the claims provided herein.

The above examples and drawings are provided for illustration purposes, and are not meant to be an exhaustive list of all possible designs and implementations pertaining to the device.

While systems, methods and other factors have been illustrated by describing examples (in considerable detail), these examples are not intended to restrict or in any way limit the scope of the appended claims to such detail. It is, of course, not possible to describe every conceivable combination of applications or methodologies for the purpose of describing this system. Additional advantages and modifications will readily appear to those skilled in the art. Therefore, the file sharing system and method, in its broader aspects is not limited to the specific details and illustrative examples shown and described. Accordingly, departures may be made from such details without departing from the spirit or scope of the general concept of the file sharing system and method.

This application is intended to embrace alterations, modifications and variations that fall within the scope of the appended claims. The preceding description is not meant to limit the scope of the submission, but rather the scope is to be determined by the appended claims and their respective equivalents.

This submission uses a number of examples that indicate a share between one person (a user) to another (a recipient). These examples are intended to simplify understanding of the concept(s) of the file sharing system and method, and are not intended to limit the number of shares, streams, file accesses or other aspects of the submission.

The file sharing system and method provides the capability for a local user to stream media that is hosted on their PCD, or media that has been shared with them from other users of the system. The functional aspects of the DLNA streaming of media to a local DLNA enabled device (e.g., a TV) will now be discussed with reference to FIG. 8A.

Figure 8A:
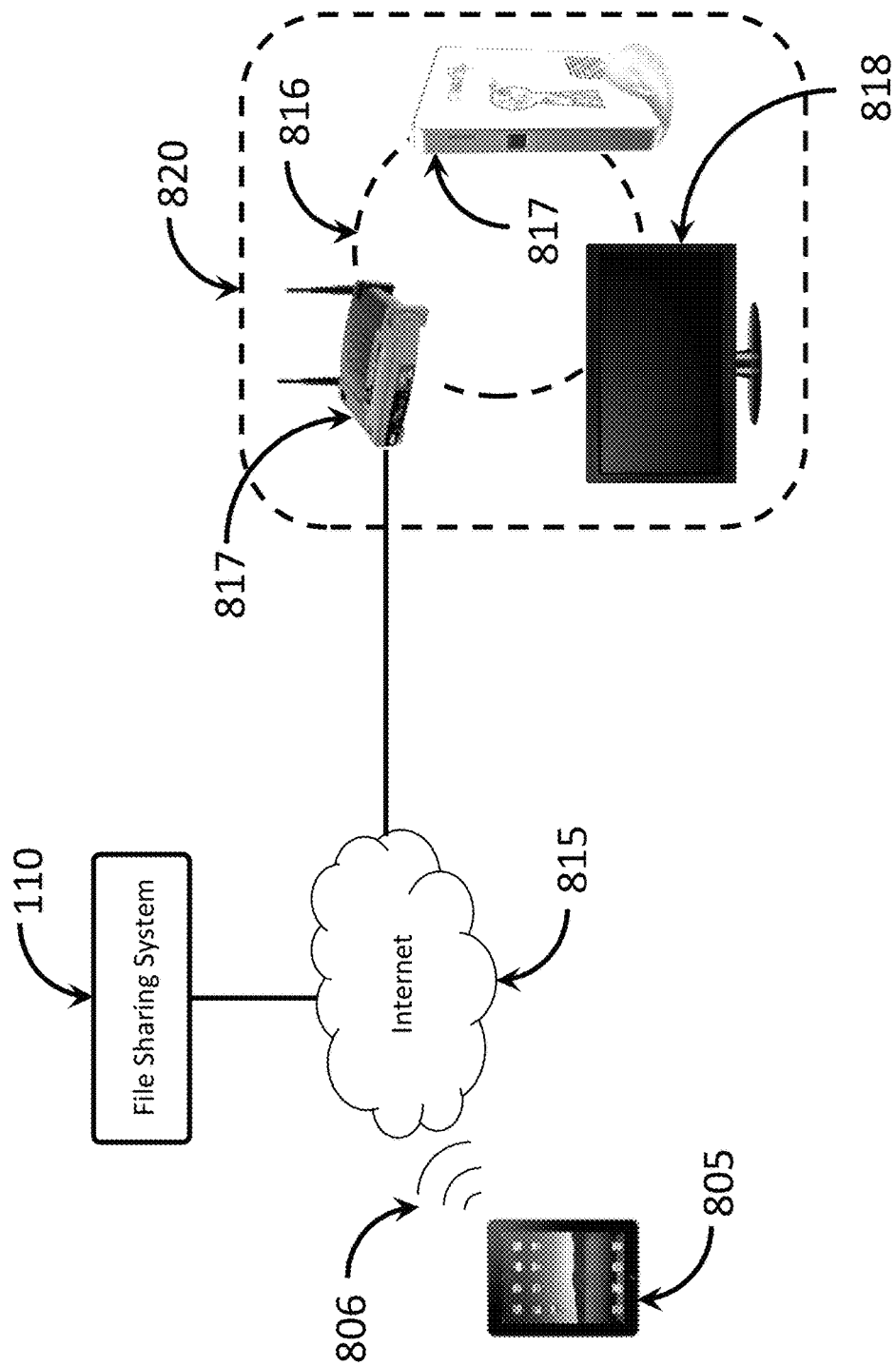
FIG. 8A is a block diagram showing a typical environment where media stored on the cloud, or shared with a user can be streamed locally through the PCD via DLNA.

FIG. 8A is a block diagram illustrating the typical configuration and implementation of the file sharing system and method. In FIG. 8A, a user has shared a file from their tablet 805 with the recipient of the share 820. In this particular instance, the share was done wirelessly 806 from the tablet 805. As can be seen in the illustration 8A, the recipient of the share has a local area network 816 comprised of a router 817, a Personal Cloud Device 817 (PCD) and a DLNA enabled TV 818. Since the PCD 818 is DLNA enabled and allows media streaming on the local area network 816, the media shared from the tablet 805 can be viewed on the DLNA enabled TV 818. While this representation shows a single share from a single user, there is no limit to the number of shares that can be initiated through the system, or the number of files that can be viewed locally with the DLNA enabled TV 818. A single share was shown to simplify the explanation of the representation. The DLNA screens on the TV are not represented because they vary by manufacturer and would not add to the explanation of the function being discussed.

Figure 8B:
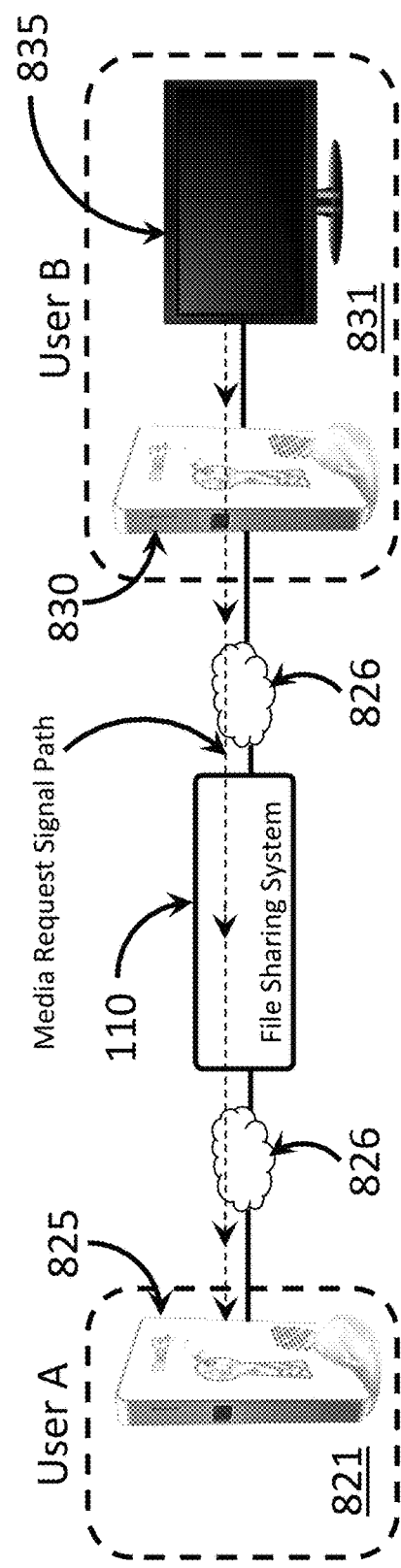
FIG. 8B is a block diagram showing the PCD to PCD media share configuration.
Figure 8B:
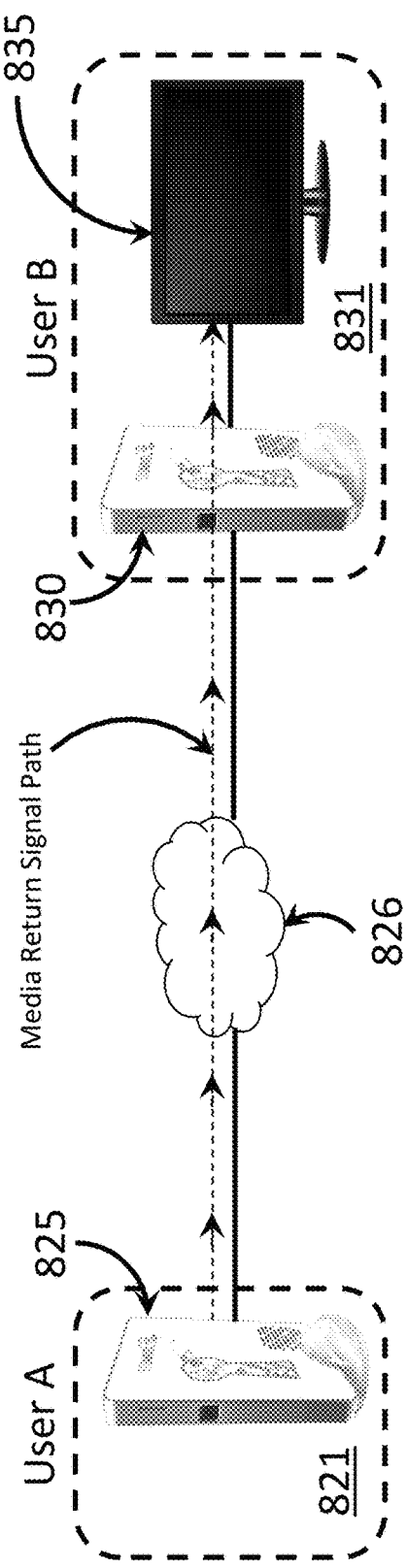

FIG. 8B shows a typical application where media has been shared between two users, and is streamed from one user's Personal Cloud Device (PCD) directly to the other user's PCD. FIG. 8B is broken down into two parts. The top half of FIG. 8B shows the authentication signal path, whereas the bottom half of FIG. 8B shows the signal sharing path. The sharing path is the path taken by the media once the authentication process is completed, and the media is shared from User A to User B. It's important to note that the share being referenced has already been established between the two users, and User B is now seeking to access and view the shared material from User A through their DLNA enabled TV.

The process begins when User B initiates the media query through their DLNA enabled TV 835. The user will access their menu (each varies depending on the manufacturer of the DLNA enabled TV) and navigate to their DLNA enabled content menu on their TV 835. Media that is hosted on and/or shared with User B through the file sharing system 110 will be accessible through the public network (e.g., internet) 826. While User B can stream any media via DLNA that is hosted on their PCD 830 or the file sharing system 110, this example expressly relates to streaming of media that is stored on (and shared from) User A's PCD 825. Files that User A has shared with User B will appear on a menu listing that User B can access and view from their DLNA enabled TV 835. As User B selects the shared media (from User A) they wish to view, the request for the media passes through User B's local area network (LAN), and through the internet 826 to the file sharing system 110. The file sharing system 110 grants User B access to the shared content through the authentication process and the media is now accessible to User B.

As can be seen in the bottom half of FIG. 8B, the media pathing has now changed from the request pathing depicted in the top half of the diagram. Once authentication has occurred, the media request from User B 831 is returned directly from User A 821, completely eliminating the need for the media to pass through the file sharing system. By enabling a direct media connection between the two PCD devices, the file sharing system minimizes the opportunity for network issues to impede, degrade or otherwise hamper the streaming between the two user devices 825 and 835.

Figure 8C:
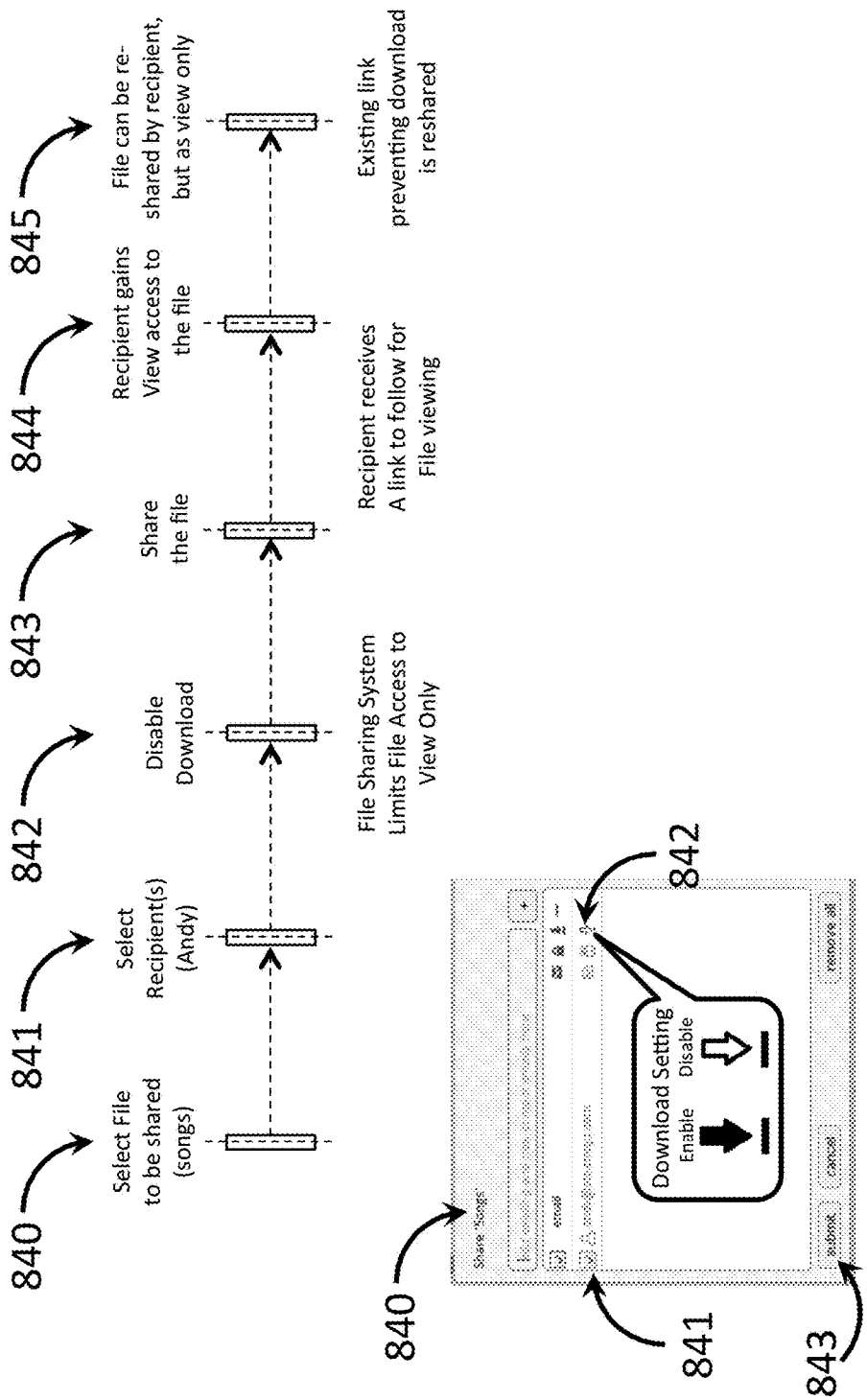
FIG. 8C is a block diagram illustrating the view only file sharing method.

The file sharing system has a unique feature that allows users (e.g., media hosts) to share their files, folders, songs, movies and other digital content without actually giving it to the recipient they are sharing with. In the traditional sense of the term "sharing," one person would give something to another person, or otherwise allow them to partake or participate in the usage and/or enjoyment of the item, without actually surrendering the item to the other person. In a similar fashion, the file sharing system enables the media host to share without surrendering their ownership rights to the media being shared. Through the permission based control, the user (i.e., media owner) can easily assign access permission to the media that controls the access and usage granted to the recipient. FIG. 8C will detail the functionality that enables the share without the downloading feature to take place.

Referring to FIG. 8C, the user will start the session by selecting the file 840 they wish to share. In this example, the filename we've chosen is "songs." Once the selection is made, the media host will select the recipient's 841 with which to share the file. In this example, we're sharing the file with "Andy." As explained in FIG. 2B, there are multiple usage permissions that can be assigned at this stage of the share. This example will focus only on the view files without download sharing method.

Now that our file 840 (Songs) and our recipient 841 (Andy) have been selected, we will now restrict Andy's usage of the file to view only, by turning off the download capability by toggling the setting 842 to disable. Once the download setting 842 is set, we can share the file by selecting the submit 843 button. This finalizes the share sequence 843 and sends a notification 844 to the recipient that a file has been shared. The notification 844 contains a link which the recipient can follow to view the file.

The notification link 844 takes the recipient 841 (Andy) to a web page where the content of the file can be viewed, played, activated and otherwise enabled, but cannot be downloaded. The web page containing the link is hosted within the File Sharing System, and restricts the recipient's (Andy's) access to the file as defined by the usage permissions set during the share. In this case, the download was restricted so the user will only be able to enjoy the content but will not be able to take ownership of the content. The recipient 841 (Andy) is free to reshare the link he received during the share sequence, allowing others to also enjoy the content that was shared. Download is completely eliminated from all parties in this scenario from the primary share (to Andy) and all subsequent shares.

Backup of digital content within the system may be performed through a series of system modules providing detailed information about the digital content being stored. The user of the file sharing system has the option of performing a backup where the contents of their backup are stored on a device they own and control, such as a personal cloud device, or in a secured storage location within the file sharing system, or both. It's important to note that while the components of the file sharing system are pictured together (within the referenced figures), they can exist independently through a local, area or global network. The following discussion on the backup function assumes the user has accessed the file sharing system, and will be performing the backup function with the system. The backup function will now be discussed with reference to FIG. 9.

Figure 9:
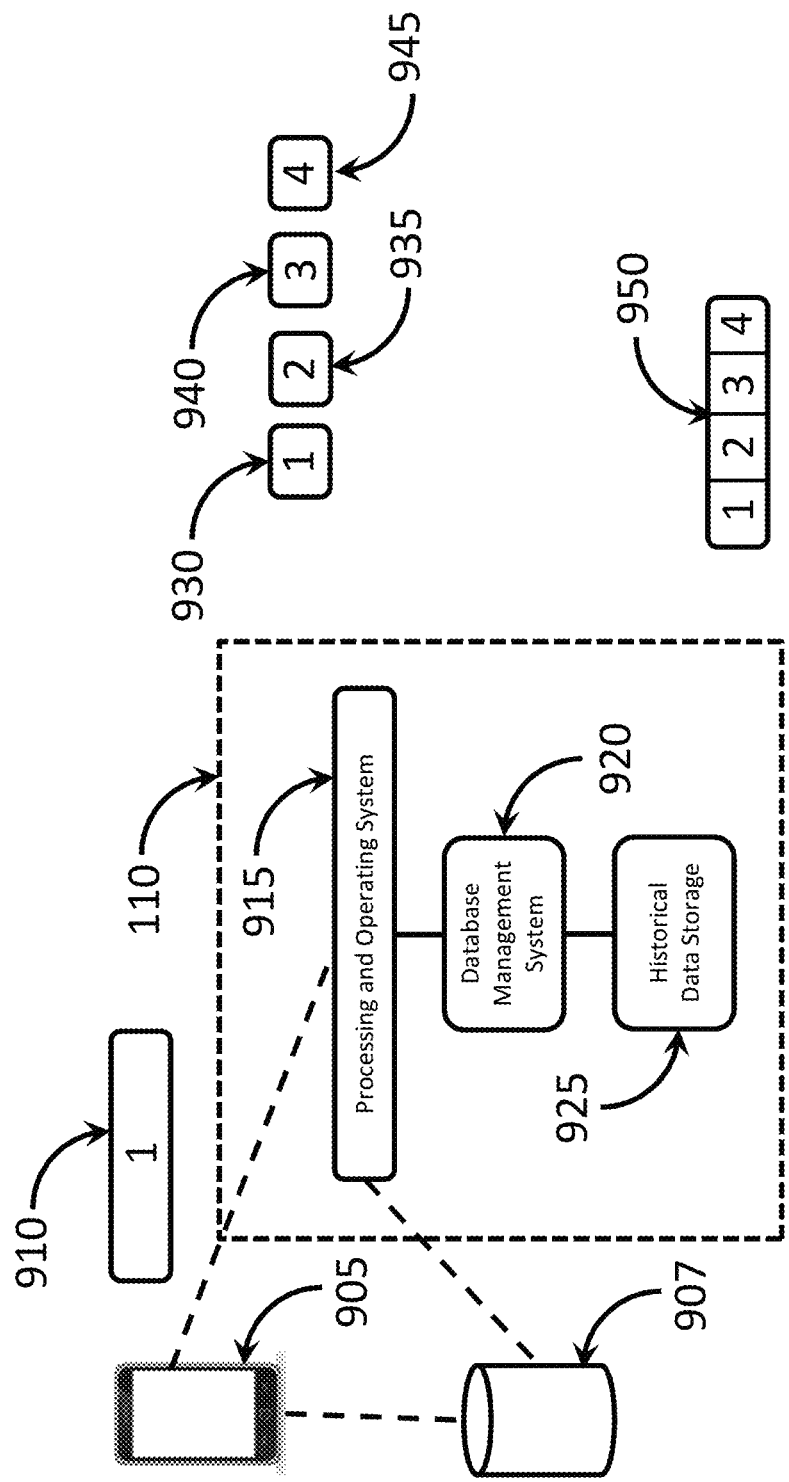
FIG. 9 is a block diagram illustrating the management of digital content that enters the file sharing system.

FIG. 9 shows a typical client side device 905, containing a file 910 that a user wishes to back up to a private storage device 907, such as a personal cloud device. The client device 905 initiates a backup command, notifying the processing and operating system 915 of a file sharing system 110 of the pending backup. The processing and operating system 915 notifies a database management system 920 that a backup is to be performed. The database management system 920 may retrieve information about the file 910 in historical data storage 925, to determine what attributes, status, physical location, current shares, current permissions and other actions that have been performed to date with the file 910 being backed up. The historical data storage 925 communicates the historical data associated with the file 910 back to the database management system 920. The database management system then takes the required file data 930 from the file being backed up 910 and attaches the historical data 935, as well as any other information the user has specified during the backup command. This information can include, but is not limited to physical backup location information 940 and encryption and/or protection methodologies 945 to be assigned to the backup. The original file 910 is now stored in a location chosen by the user device 905. The compiled file backup information 950, including all of the additional system information added (historical data 935, backup location 940, encryption 945 and any other specified content information) is collected through the operating system 915 by the database management system 920, and submitted to the historical data storage 925.

If the user device 905 chose to backup the file 910 privately, then the only backup copy of the file 910 that would exist is the copy sent to the private storage device 907. The compiled file backup information 950 would contain all of the information pertaining to the file, but not the actual file itself. The information that would be saved (as stated previously) is the file data 930 (less the file contents), the current historical data 935, the backup location information 940, the encryption information 945 and any other information that pertains to any activity that has been executed against the file 910 since the time the file 910 entered the file sharing system, up to the time the backup was performed. Historical data 950 may be stored within the historical data storage module 925 for the entire life of the file 910. Each time a file enters the system, it is immediately identified and cataloged within the historical data storage 925 module, such as by a personal cloud device. Every view, every share, every execution, every action taken to the file 910 is noted by the database management system 920 and recorded into the historical data storage 925 module.

File sharing within the file sharing system is conducted from a file host to one or more recipients. The attributes for the file to be shared, as well as the recipients and their various access rights to the content being shared are determined by the file host. The file sharing system establishes a direct connection from the host to the recipient(s) of a share, allowing the file to pass directly between the host and the one or more recipients, without having the file exist on, or otherwise be stored to a web server. It's important to note that the file sharing system will allow a file host to store their digital content on a web server, but it is not a requirement to enable full utilization of the sharing and control tools provided within the system. Enabling a file to be shared between parties without requiring that file to pass to a web based server enhances the overall privacy and security aspects for the file host. A typical file sharing scenario will now be discussed with reference to FIG. 10.

Figure 10:
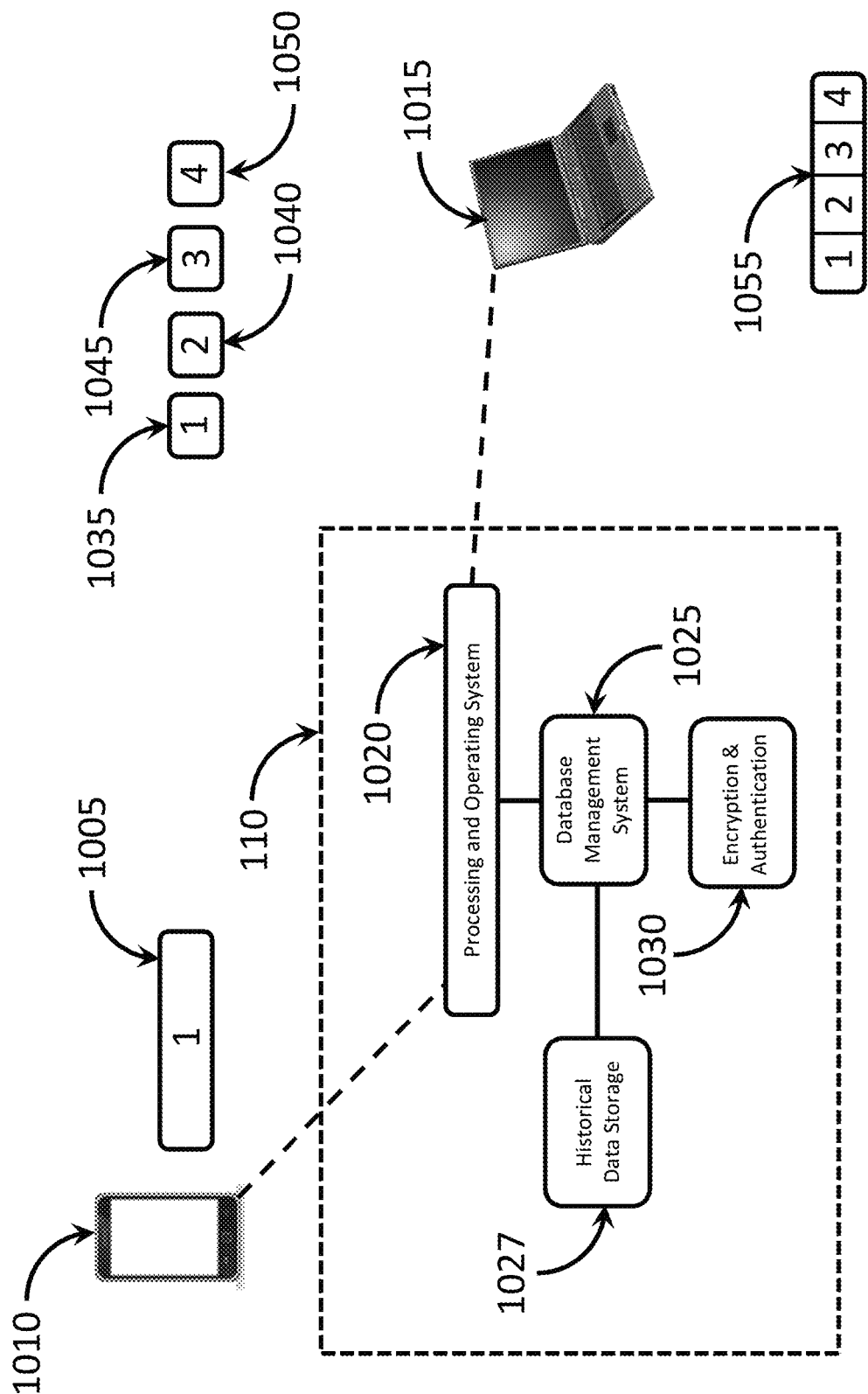
FIG. 10 is a block diagram illustrating a typical configuration of a share between parties, without the utilization of a web based server.

FIG. 10 shows a user device 1010 that contains a file 1005 that is to be shared with a second user 1015. The process begins by the user device 1010 initiating a share command through the processing and operating system 1020 of the file sharing system. The processing and operating system 1020 then communicates with the database management system 1025 to get information related to the file 1005 being shared. The database management system 1025 sends the file share request, along with the current file attributes (such as file location, file size, file transaction history, etc) to the encryption and authentication module 1030. If the user device 1010 requested protection be applied to the file 1005 during the share, the encryption and authentication module 1030 would notify the database management system 1025 that protection is required, causing the database management system 1025 to set the protection according to the requirements generated by the user device 1010. The database management system 1025 would then attach the security requirements to the file 1005 being shared and notify the host device 1010 that the share transaction has begun. The information attached to the shared file can include (but is not limited to) multiple-factor protection information 1040, access permission to the file being shared 1045 and any additional historical information required by the share 1050. The file 1005 now has the above criteria (multiple-factor protection information 1040, access permissions 1045 and historical information 1050) attached to it, prior to leaving the user device 1010. Once the above information has been properly associated with the file 1005 on the user device 1010, the share may be executed. The recipient device 1015 will receive a file 1055 that contains the original file 1005, along with the additional information attached as described above. The database management system 1025 will record the transaction and send a copy of the transaction information to the historical data storage 1027 module. Since the file 1005 is shared directly from the user device 1010, the file is neither uploaded to, backed up to, nor copied to a web server.

Keeping the digital content off a web server provides the host with significant privacy advantages since typical web server configurations are "backed up" to a variety of other servers, potentially in multiple locations, creating copies of digital content that was not otherwise intended to be shared with a public (non-user owned) server.

The file sharing system provides a "time to live" function that enables the digital content host to select specific times, dates and other criteria for expiration of functions like shares, link shares, private shares, streaming and access rights and a variety of other conditions that may be placed on digital content whether it is being shared with one or more recipients, or being stored in a configuration such as a private backup or personal storage device. As an example, a file host may wish to terminate a recipient's access to shared digital content at a specific date and time. The time to live function would facilitate that action to terminate the recipient's access rights. In another example, a file host may be keeping credit card statements in a private storage device, such as a personal cloud device. The statements are on a "time to live" that is set to expire at a future time and date wherein the statements will (or would) be no longer relevant to the file host. This function will automatically destroy the saved data, freeing up space on the storage device hosting the information. The file owner will receive a notification (through the file sharing systems notification function), requesting confirmation of the destruction of the stored material. The file owner may choose to extend the storage of the files, terminate the files, or disable the time to live feature. An example of the time to live feature will now be discussed with reference to FIG. 11. It's important to note that while time to live provides a number of different configurations for management of digital content, this submission limits the examples to ease the explanation of the functionality presented.

Figure 11:
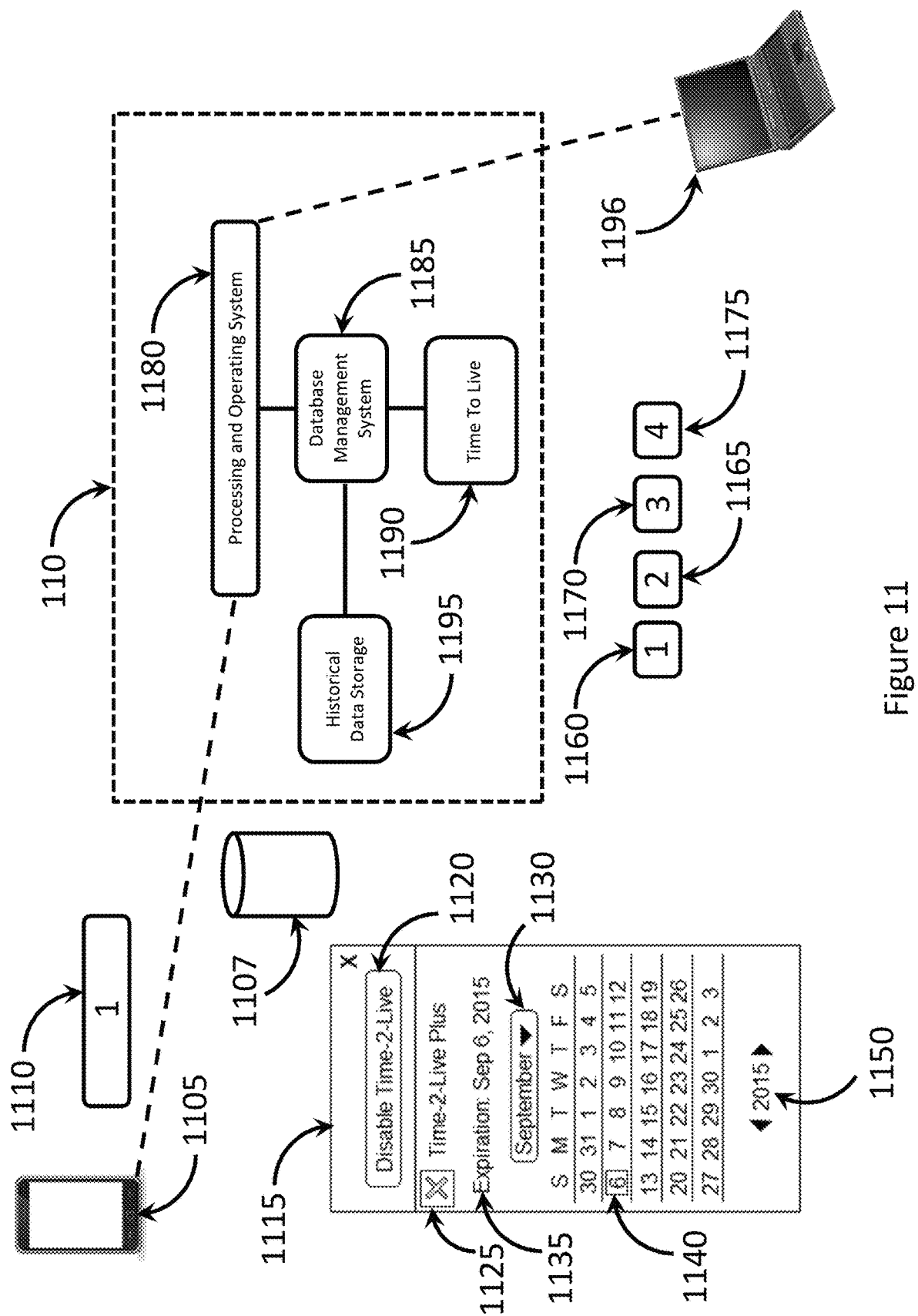
FIG. 11 is a block diagram illustrating the time to live function.

As can be seen in FIG. 11 a user device 1105 contains a file 1110 to be shared with a recipient 1196. The recipient device 1196 is currently powered down, or otherwise offline, preventing it from receiving any shared digital content.

The user device 1105 executes the command to initiate the time to live function, opening a window 1115, with the time to live setting menu. It's important to note that while the time to live feature provides granularity of expiration settings down to the second, the representation 1115 is limited to the calendar day to ease explanation of the time to live function.

The time to live setting menu 1115 allows a user device 1105 to set the expiration month 1130, the expiration day 1140 and the expiration year 1150. In this example, the user device 1105 will set the time to live plus setting 1125 to enable (i.e. the "X" will fill in). the time to live plus function instructs the file sharing system to store a copy of the shared file 1110, along with all share settings, permissions and attributes to a storage device 1107 where it will remain until the recipient device 1196 comes back online, or until the expiration date and time as set on the time to live setting menu 1115 expires, whichever comes first.

In a typical sharing scenario, the file sharing system will execute a share between a user device 1105 and a recipient device 1196. If the recipient device 1196 or the user device 1105 is offline, the share will be executed at a time when both devices are online. The time to live feature allows the user device 1105 to instruct the system to store a copy to a remote storage device 1107 for retrieval by the recipient 1196, even if the user device 1105 is offline. Since the file sharing system does not require a web server to upload and/or store information to be shared, the storage device 1107 may be owned and operated by the user 1105. The storage device 1107 could be a personal cloud device or other such storage repository connected to the system.

As with other file sharing activities executed through the file sharing system, the processing and operating system 1180 will notify the database management system 1185 of the share being transacted. Since the time to live function is active, the time to live module 1190 will attach the applicable user settings to the share, as executed through the time to live setting menu 1115. The historical data storage 1195 will store the information (including, but not limited to the original file being shared 1160, the time to live settings 1165 as well as any access rights and/or permission settings 1170 that may be activated from the user device 1105, along with any historical data 1175 that was previously executed against the file 1110.

Time to live 1115 can be enabled or disabled 1120 at any time. The individual settings within time to live 1115 will remain until changed by the user 1105. As can be seen in FIG. 11, the current time to live 1115 settings indicate the expiration date 1135 of a share to be Sep. 6, 2015. As previously stated, this setting will remain in effect unless otherwise disabled 1120 by the user device 1105.

The file sharing system provides a communications capability that allows one or more users of the system to communicate in real time, or to leave messages for users or groups of users. The communications function establishes a direct connection between the one or more users, negating the need for the communications messages to be generated from, or stored within a web server. The connection is established by the user initiating the contact to the one or more recipients of the message.

Messages may be accepted, rejected, ignored or blocked, and can be stored in the file sharing system historical database at the discretion of the one or more users. Any user that does not wish to have their communications stored may opt out of the history storage, making their communications un-traceable. As an example, a first user may wish to establish a chat with a second user. While the first user has selected to store the contents of the chat, the second user has chosen to keep the chat private. In this example, the first user will be notified that the recipient has elected to keep the chat private. The first user and the second user may then discuss among themselves if they jointly wish to store a copy of the communication. Once the participants reach an agreement, the communication can proceed accordingly.

The communications function was designed to allow individual users to opt-out of communications and messaging storage to provide a higher level of security for circumstances wherein the sensitivity of the information being discussed is not for review by parties outside of those participating in the live chat. An example would be a law office working with a client on a legal matter, wherein the client wishes to keep the communications solely between himself and the attorney of record.

In cases where the communications is stored, each participant of the chat will be given the opportunity to keep a record of the chat and store it either on the file sharing system or on a personal device such as a personal cloud device or private storage repository. The file sharing system will keep a record of the fact that a chat took place, but will not store the chat contents unless a user has expressly selected that the file sharing system store a backup of the chat contents in their entirety. It's important to note that while the communications function within the file sharing system has a variety of security levels requiring all users to authenticate their identification to participate in the chat, the simplest form and function is shown to aid in the ease of explanation of the communications function. A typical example of the communications function between two parties will now be discussed with reference to FIG. 12.

Figure 12:
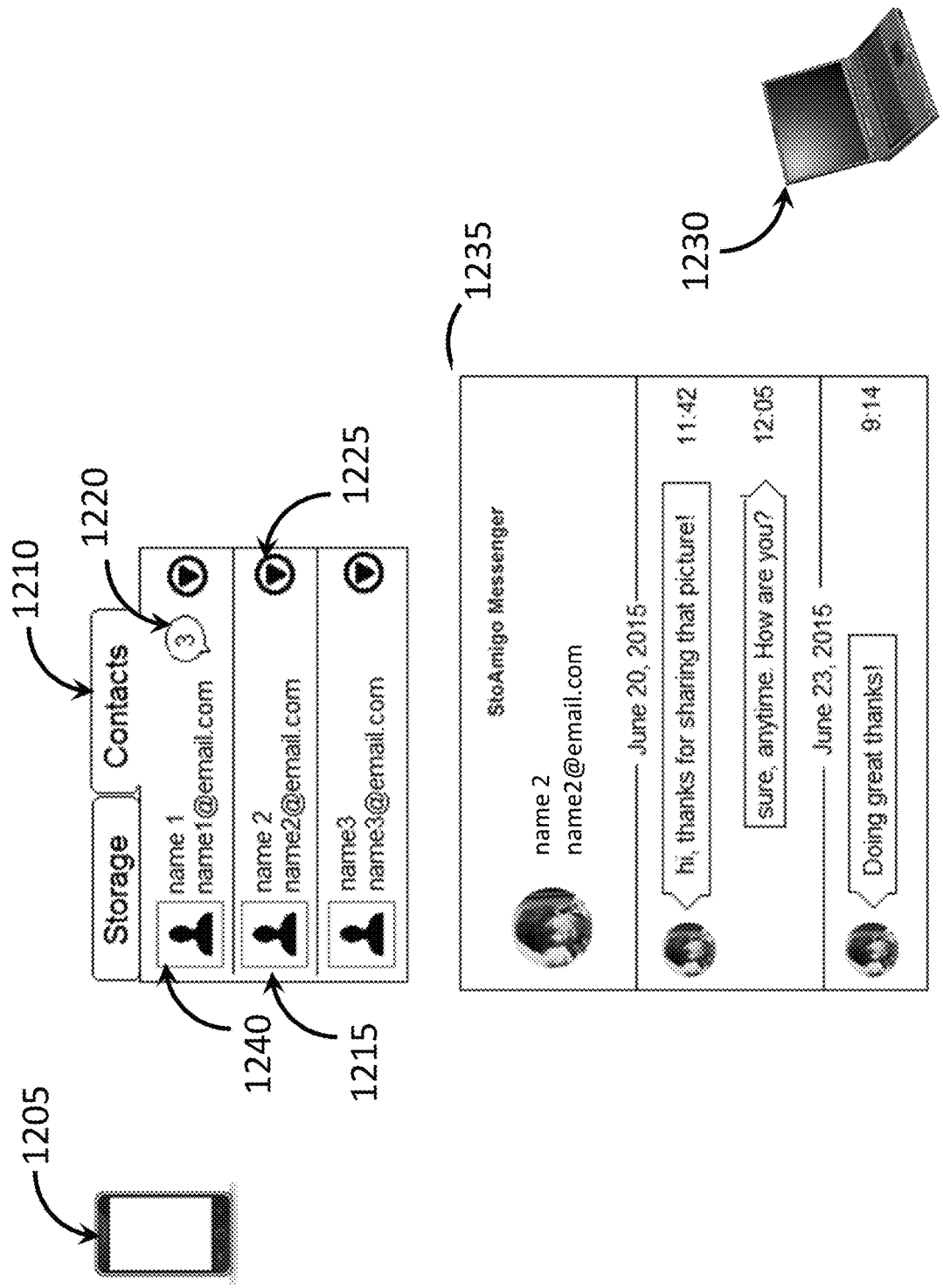
FIG. 12 is a block diagram illustrating the communications link between one or more users of the file sharing system.

As can be seen in FIG. 12, a user device 1205 wishes to establish a chat with a second user device 1230. The user device 1205 will access the chat through the contacts tab 1210 on the file sharing system. From the contacts tab 1210, the user device 1205 can select one or more participants in which to communicate with by simply accessing the pull down menu 1225 next to the participants name and then add to chat (not pictured). In this example, the user device 1205 has chosen to communicate with name2 1215. Once the chat begins, a window 1235 will open on the user device 1205 wherein the user device 1205 can enter messages as shown in window 1235. The date and time stamp information will vary, based on the level of security and the chat storage settings selected by the user device 1205 and the second user device 1230. As stated previously, if the second user 1230 has selected to not store a copy of the chat in the file sharing system history database (not pictured), the first user device 1205 will receive a notification from the file sharing system that the second user 1230 has chosen to keep the communications session private.

Once a chat session has begun, other users can be added by selecting the user name from the contacts list 1210 and utilizing the pull down menu 1225 to add the user to the chat session (not pictured). In a similar fashion, users can be removed from a communications session as well. Each time the participants in a communications session changes, all parties will receive a notification from the file sharing system that a participant has either joined or left the communications group. The communications session is automatically terminated when all participants leave the group if the communications session was private and not to be stored or otherwise backed up to the file sharing system historical database (not shown). If the chat session is not private, the chat will remain open between the parties until it is closed. This allows participants to randomly leave messages for other users at their leisure. As an example, (referring to FIG. 12) user name1 1240 has 3 non-private messages waiting as indicated by the chat bubble 1220 with the number 3 visually indicated. The open chat (non-private) function allows users of the file sharing system to leave messages and notes for other parties.

Users of the file sharing system may opt to block or otherwise not accept communications from one or more users. In cases where communications has been restricted, the user sending the communication will be notified that message cannot be delivered at the current time as the intended recipient is not receiving messages. Tools are provided to allow users to configure personalized messages when they are not receiving messages such as "out of the office" or "on vacation" type notifications.

The file sharing system provides the capability to enable users to accept or reject file shares from one or more second users. More specifically, a first user can choose to reject a file share from a second user on an "as shared" basis, or to reject all shares from a specific user. In one preferred embodiment, a first user may choose to reject a file shared from a second user, while choosing to accept a subsequent file share from the same second user. This gives the first user control of the digital content they receive on a "by case" type basis. Moreover, the first user can decide to reject or block all shared material from the second user. Rejected shares will initiate a notification from the file sharing system to the second user that the first user is rejecting the file share. Personalized messages may be added to a file rejection to allow the intended file recipient to notify the sender of their reason for rejection.

In another embodiment of the file rejection functionality, a user may be planning time away from their employ, in which case they may select to reject all shares from all users, with a notification that they are out of the office and will return at a future date. The file sharing system provides a significant amount of flexibility in the rejection methodology of file sharing to give more control to each user as to the management of their digital content. As with all features and functions within the system, the file rejection capability may be enabled and/or disabled at any time by the user.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A file sharing system for one or more files, the file sharing system comprising:
   a server comprising one or more storage devices, wherein in operation the server receives and stores one or more file usage permissions for the one or more files on the one or more storage devices and generates one or more backups of historical information recording sharing activity of the one or more files; and
   one or more personal storage devices remote from the server and comprising one or more communication devices and at least one storage device that stores the one or more files, wherein in operation the one or more personal storage devices:
      retrieve the one or more file usage permissions associated with a requested file from the server, wherein the requested file is one of the one or more files;
      provide access to the requested file based on the one or more file usage permissions associated with the requested file; and
      establish a direct connection between the one or more communication devices and a recipient device, wherein access to the requested file is provided to the recipient device via the direct connection;
   wherein the requested file is never stored on the server;
   wherein the one or more backups are stored on the one or more storage devices or the at least one storage device.

2. The file sharing system of claim 1, wherein the one or more file usage permissions include an expiration date, wherein after the expiration date all access to the one or more files is denied by the one or more personal storage devices.

3. The file sharing system of claim 1, further comprising a first client device, wherein the one or more file usage permissions are generated at the first client device and transmitted to the server from the first client device.

4. The file sharing system of claim 3, wherein the first client device and the recipient device communicate one or more messages between one another.

5. The file sharing system of claim 1, wherein the one or more backups identify a number of shares of the one or more files, one or more of the one or more file usage permissions utilized during each of the shares, and a number of copies of the one or more files stored in alternative locations.

6. The file sharing system of claim 1, wherein the server generates one or more backups of environmental information pertaining to the one or more files.

7. A file sharing system for one or more files, the file sharing system comprising:
   a server comprising one or more storage devices, wherein in operation the server:
      receives and stores one or more file usage permissions for the one or more files on the one or more storage devices;
      generates one or more backups of historical information recording sharing activity of the one or more files; and
      receives and stores file usage history for the one or more files on the one or more storage devices; and
   one or more personal storage devices remote from the server and comprising one or more communication devices and at least one storage device that stores the one or more files, wherein in operation the one or more personal storage devices:
      retrieve the one or more file usage permissions associated with a requested file from the server, wherein the requested file is one of the one or more files;
      attach the file usage history to the requested file such that the file usage history is part of the requested file; and
      provide a recipient device access to the requested file based on the one or more file usage permissions associated with the requested file;
   wherein the requested file is never stored on the server;

wherein the one or more backups are stored on the one or more storage devices or the at least one storage device.

8. The file sharing system of claim 7, wherein the one or more file usage permissions include an expiration date, wherein after the expiration date all access to the one or more files is denied by the one or more personal storage devices.

9. The file sharing system of claim 7, further comprising a first client device, wherein the one or more file usage permissions are generated at the first client device and transmitted to the server from the first client device.

10. The file sharing system of claim 9, wherein the first client device and the recipient device communicate one or more messages between one another.

11. The file sharing system of claim 1, further comprising establishing a direct connection between the one or more communication devices and the recipient device, wherein access to the requested file is provided to the recipient device via the direct connection.

12. The file sharing system of claim 7, wherein the one or more backups identify a number of shares of the one or more files, one or more of the one or more file usage permissions utilized during each of the shares, and a number of copies of the one or more files stored in alternative locations.

13. The file sharing system of claim 7, wherein the server generates one or more backups of environmental information pertaining to the one or more files.

14. A method of sharing one or more files with a file sharing system comprising a server and one or more personal storage devices, the method comprising:
   storing the one or more files on a storage device of the one or more personal storage devices;
   receiving and storing one or more file usage permissions for the one or more files on one or more storage devices of the server;
   generating one or more backups of historical information recording sharing activity of the one or more files;
   receiving and storing file usage history for the one or more files on the one or more storage devices;
   retrieving, at the one or more personal storage devices, the one or more file usage permissions associated with a requested file from the server, wherein the requested file is one of the one or more files;
   attaching the file usage history to the requested file such that the file usage history is part of the requested file; and
   providing a recipient device access to the requested file based on the one or more file usage permissions associated with the requested file;
   wherein the requested file is never stored on the server;
   wherein the one or more backups are stored on the one or more storage devices or the one or more personal storage devices.

15. The method of claim 14, wherein the one or more file usage permissions include an expiration date, wherein after the expiration date all access to the one or more files is denied by the one or more personal storage devices.

16. The method of claim 14, wherein the one or more file usage permissions are generated at a first client device and transmitted to the server from the first client device.

17. The method of claim 16, wherein the first client device and the recipient device communicate one or more messages between one another.

18. The method of claim 14, further comprising establishing a direct connection between the one or more communication devices and the recipient device, wherein access to the requested file is provided to the recipient device via the direct connection.

19. The method of claim 14, wherein the one or more backups identify a number of shares of the one or more files, one or more of the one or more file usage permissions utilized during each of the shares, and a number of copies of the one or more files stored in alternative locations.

20. The method of claim 14, further comprising generating one or more backups of environmental information pertaining to the one or more files.

\* \* \* \* \*

UNITED STATES PATENT AND TRADEMARK OFFICE
CERTIFICATE OF CORRECTION

PATENT NO. : 10,970,412 B2  
APPLICATION NO. : 16/132396  
DATED : April 6, 2021  
INVENTOR(S) : Benedict Ow It is certified that error appears in the above-identified patent and that said Letters Patent is hereby corrected as shown below:

In the Claims

Column 33, Line 15, Claim 11 the claim reference numeral "1" should read --7--.

Signed and Sealed this  
Eleventh Day of May, 2021

Drew Hirshfeld  
*Performing the Functions and Duties of the*  
*Under Secretary of Commerce for Intellectual Property and*  
*Director of the United States Patent and Trademark Office*